United States Patent
Hwang et al.

(10) Patent No.: US 9,374,743 B2
(45) Date of Patent: Jun. 21, 2016

(54) METHOD OF HANDING OVER UE TO SMALL-SCALE CELL IN MACRO CELL AND ENVIRONMENT IN WHICH SMALL-SCALE CELL COEXISTS

(71) Applicant: LG ELECTRONICS INC., Seoul (KR)

(72) Inventors: Jinyup Hwang, Seoul (KR); Sangwook Lee, Seoul (KR); Manyoung Jung, Seoul (KR); Yoonoh Yang, Seoul (KR); Suhwan Lim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/415,521

(22) PCT Filed: Jul. 11, 2013

(86) PCT No.: PCT/KR2013/006175
§ 371 (c)(1),
(2) Date: Jan. 16, 2015

(87) PCT Pub. No.: WO2014/021563
PCT Pub. Date: Feb. 6, 2014

(65) Prior Publication Data
US 2015/0163707 A1    Jun. 11, 2015

Related U.S. Application Data

(60) Provisional application No. 61/677,006, filed on Jul. 30, 2012.

(51) Int. Cl.
*H04W 4/00* (2009.01)
*H04W 36/00* (2009.01)
(Continued)

(52) U.S. Cl.
CPC .......... *H04W 36/0061* (2013.01); *H04W 8/005* (2013.01); *H04W 24/08* (2013.01); *H04W 36/06* (2013.01); *H04W 36/04* (2013.01)

(58) Field of Classification Search
None
See application file for complete search history.

(56) References Cited

U.S. PATENT DOCUMENTS

| 2007/0153747 | A1  | 7/2007 | Pan et al. |
| 2011/0034174 | A1* | 2/2011 | Xu ................... H04W 72/0426 455/447 |

(Continued)

FOREIGN PATENT DOCUMENTS

| KR | 10-2005-0020055 | 3/2005 |
| KR | 10-2009-0005604 | 1/2009 |

(Continued)

OTHER PUBLICATIONS

PCT International Application No. PCT/KR2013/006175, Written Opinion of the International Searching Authority dated Sep. 24, 2013, 1 page.

(Continued)

*Primary Examiner* — Afshawn Towfighi
(74) *Attorney, Agent, or Firm* — Lee, Hong, Degerman, Kang & Waimey; Jonathan Kang; Harry Lee

(57) ABSTRACT

The present invention relates to a method of providing, by a UE served in a small-scale cell, information about surrounding UEs in a wireless communication system in which a macro cell and the small-scale cell coexist. The method can include the steps of: carrying out a handover from the macro cell to the small-scale cell; after completion of the handover, overhearing a signal transmitted by the UE; measuring signal intensities of the surrounding UEs; and, if the signal intensities meet predefined conditions, delivering information about the surrounding UEs to the small-scale cell.

11 Claims, 22 Drawing Sheets

(51) Int. Cl.
*H04W 8/00* (2009.01)
*H04W 24/08* (2009.01)
*H04W 36/06* (2009.01)
*H04W 36/04* (2009.01)

(56) References Cited

U.S. PATENT DOCUMENTS

2011/0051684 A1\* 3/2011 Li .................. H04W 36/20
                                                    370/331
2011/0299446 A1 12/2011 Chun et al.

FOREIGN PATENT DOCUMENTS

KR 10-2010-0115991 10/2010
KR 10-2011-0096456 8/2011

OTHER PUBLICATIONS

European Patent Office Application No. 13826454.4, Search Report dated Mar. 3, 2016, 8 pages.

\* cited by examiner

METHOD OF HANDING OVER UE TO SMALL-SCALE CELL IN MACRO CELL AND ENVIRONMENT IN WHICH SMALL-SCALE CELL COEXISTS

CROSS-REFERENCE TO RELATED APPLICATIONS

This application is the National Stage filing under 35 U.S.C. 371 of International Application No. PCT/KR2013/006175, filed on Jul. 11, 2013, which claims the benefit of U.S. Provisional Application Ser. No. 61/677,006, filed on Jul. 30, 2012, the contents of which are hereby incorporated by reference herein in their entirety.

FIELD OF THE INVENTION

The present invention relates to a wireless communication system in which a macro cell and a small-scale cell coexist.

RELATED ART

3GPP (3rd Generation Partnership Project) LTE (Long Term Evolution) that is an advancement of UMTS (Universal Mobile Telecommunication System) is being introduced with 3GPP release 8. In 3GPP LTE, OFDMA (orthogonal frequency division multiple access) is used for downlink, and SC-FDMA (single carrier-frequency division multiple access) is used for uplink. To understand OFDMA, OFDM should be known. OFDM may attenuate inter-symbol interference with low complexity and is in use. OFDM converts data serially input into N parallel data pieces and carries the data pieces over N orthogonal sub-carriers. The sub-carriers maintain orthogonality in view of frequency. Meanwhile, OFDMA refers to a multiple access scheme that realizes multiple access by independently providing each user with some of sub-carriers available in the system that adopts OFDM as its modulation scheme.

Recently, 3GPP LTE-Advanced (LTE-A) which is an evolution of 3GPP LTE has been discussed.

In addition, a hetero-network in which a macro cell and a small-scale cell coexist has been discussed recently. Particularly, discussions have been progressed in order to detour traffic by dispersing terminals connected to a macro cell into a small-scale cell.

However, coverage of the small-scale cell is anticipated to be very narrow and it is highly probable that a plurality of terminals is located outside of the coverage of small-scale cell. Accordingly, the effort to disperse the traffic may be useless.

SUMMARY OF THE INVENTION

The present specification introduces methods which enable a terminal located outside of coverage of a small-scale cell to access the small-scale cell in an environment in which a macro cell and a small-scale cell coexist.

In order to achieve the object, in an aspect, there is provided a method for providing information on a neighboring user equipment (UE) in a wireless communication system in which a macro cell and a small cell coexist. The method may be performed by a UE served by a small cell and comprise: performing, by the UE, a handed over from the macro cell to the small cell; overhearing a signal transmitted by the neighboring UE after the hand-over is completed; measuring a signal intensity of the neighboring UE; and transferring information on the neighboring UE to the small cell when the signal intensity meets a predetermined condition.

The hand-over may be performed when the UE is positioned at a coverage extension region of the small cell or a cell range expansion (CRE) region.

The overheard signal may be a device to device (D2D) discovery signal transmitted by the neighboring UE. The discovery signal may be a UE-specific reference signal (URS), a demodulation reference signal (DM-RS), or a sounding reference signal (SRS), or a discovery dedicated signal.

Alternatively, the overheard signal may be an uplink signal which the neighboring UE transmits to the macro cell. Here, the uplink signal may be a PUCCH or a PUSCH.

When the neighboring UE is not served by the small cell, the information on the neighboring UE may be used by the small cell in order to request the hand-over to the macro cell.

In order to achieve the object, in an aspect, there is provided a method for acquiring information on a user equipment (UE) from a UE served by a small cell in a wireless communication system in which a macro cell and the small cell coexist. The method may comprise: transferring, the small cell, a request for discovering one or more neighboring UEs to a UE handed over from the macro cell; receiving, by the small cell, information on one or more neighboring UEs from the UE; verifying whether one or more neighboring UEs are served by the small cell itself; and transferring the information on one or more neighboring UEs in order to hand over one or more neighboring UEs not served by the small cell itself from the macro cell.

The UE may be a UE which has been handed over from the macro cell at the position of a coverage extension region of the small cell or a cell range expansion (CRE) region.

The transferring of the information on one or more neighboring UEs may be performed when the neighboring UE meets a predetermined condition.

The predetermined condition may be met when the signal intensity of the neighboring UE measured by the UE is equal to or less than a predetermined value.

According to the present disclosure, a UE outside coverage of a small-scale cell may access the small-scale cell under an environment in which a macro cell and the small-scale cell coexist.

DESCRIPTION OF EXEMPLARY EMBODIMENTS

Figure 1:
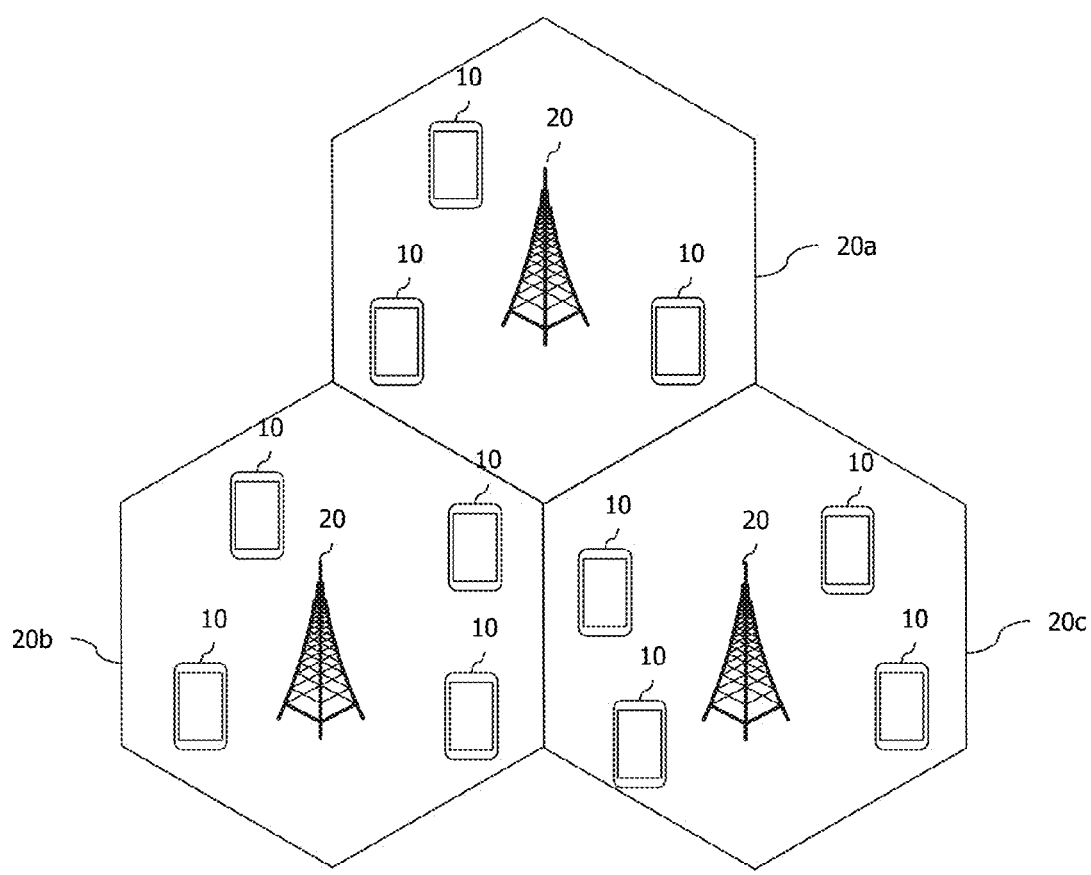
FIG. 1 illustrates a wireless communication system.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'wireless device' may be stationary or mobile, and may be denoted by other terms such as terminal, MT (mobile terminal), UE (user equipment), ME (mobile equipment), MS (mobile station), UT (user terminal), SS (subscriber station), handheld device, or AT (access terminal).

As used herein, 'base station' generally refers to a fixed station that communicates with a wireless device and may be denoted by other terms such as eNB (evolved-NodeB), BTS (base transceiver system), or access point.

Hereinafter, applications of the present invention based on 3GPP (3rd generation partnership project) LTE (long term evolution) or 3GPP LTE-A (advanced) are described. However, this is merely an example, and the present invention may apply to various wireless communication systems. Hereinafter, LTE includes LTE and/or LTE-A.

FIG. 1 shows a wireless communication system.

The wireless communication system 10 includes at least one base station (BS) 11. Respective BSs 11 provide a communication service to particular geographical areas 15a, 15b, and 15c (which are generally called cells). Each cell may be divided into a plurality of areas (which are called sectors). A user equipment (UE) 12 may be fixed or mobile and may be referred to by other names such as mobile station (MS), mobile user equipment (MT), user user equipment (UT), subscriber station (SS), wireless device, personal digital assistant (PDA), wireless modem, handheld device. The BS 11 generally refers to a fixed station that communicates with the UE 12 and may be called by other names such as evolved-NodeB (eNB), base transceiver system (BTS), access point (AP), etc.

The terminal generally belongs to one cell and the cell to which the terminal belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the terminal.

Hereinafter, a downlink means communication from the base station 20 to the terminal 10 and an uplink means communication from the terminal 10 to the base station 20. In the downlink, a transmitter may be a part of the base station 20 and a receiver may be a part of the terminal 10. In the uplink, the transmitter may be a part of the terminal 10 and the receiver may be a part of the base station 20.

Meanwhile, the wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmit antennas and a plurality of receive antennas. The MISO system uses a plurality of transmit antennas and one receive antenna. The SISO system uses one transmit antenna and one receive antenna. The SIMO system uses one transmit antenna and one receive antenna. Hereinafter, the transmit antenna means a physical or logical antenna used to transmit one signal or stream and the receive antenna means a physical or logical antenna used to receive one signal or stream.

Figure 2:
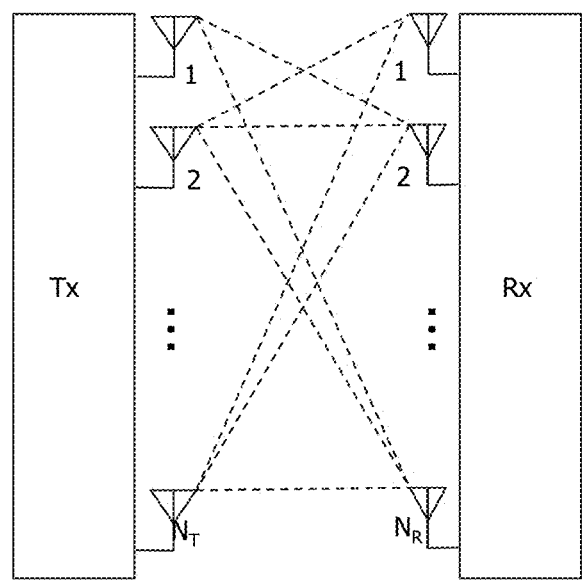
FIG. 2 illustrates a general multiple antenna system.

FIG. 2 illustrates a general multiple antenna system.

As shown in FIG. 2, when increasing the number of transmission antenna to $N_T$ and increasing the number of reception antenna to $N_R$ at the same time, a transmission rate can be increased and a frequency efficiency can be dramatically increased because a theoretical channel transmission capacity is increased in proportion to the number of antenna, unlike the case of using multiple antennas only in either one of transmitter or receiver.

The transmission rate due to the increase of channel transmission capacity may be theoretically increased by multiple of a maximum transmission rate $R_o$ in case of using an antenna and a rate increase $R_i$ as shown below. That is, for example, in the MIMO communication system that uses 4 transmission antennas and 4 reception antennas, the transmission rate may be increased 4 times in comparison with the single antenna system theoretically.

After the theoretical increase of capacity in such a multiple antenna system is proved in the middle of 1990', various technologies to induce the theoretical increase into actual increase of data transmission rate has been researched up to now, and a few of the technologies are already applied to various wireless communication standards such as third generation mobile communication and next generation wireless LAN, etc.

$$R_i = \min(N_T, N_R) \quad \text{[Equation 1]}$$

The research trends in relation to the multiple antenna up to now show that researches have been vigorously progressed in various aspects such as a research in the aspect of information theory in relation to communication capacity calculation of multiple antenna in various channel environment and multiple access environment, researches of wireless channel measurement and modeling process of the multiple antenna system, and a research of space-time signal processing for increasing transmission reliability and transmission rate, etc.

In a user equipment structure having general MIMO channel environment, reception signals received in each reception antenna can be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R 1} & h_{N_R 2} & \cdots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = \quad \text{[Equation 2]}$$

$$Hx + n$$

Herein, the channel between respective transmission and reception antennas may be distinguished based on transmission and reception index, and the channel passing from a transmission antenna j to a reception antenna i is represented as $h_{ij}$. In case of using precoding scheme like LTE when transmitting a signal, the transmission signal x can be expressed by Equation 3.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = \quad \text{[Equation 3]}$$

$$W\hat{s} = WPs$$

Herein, $w_{ij}$ a precoding matrix w means a weighting between a $i^{th}$ transmission antenna and $j^{th}$ information. In this time, if the transmission power of a respective signal to be transmitted is $P_1, P_2, \ldots, P_{NT}$, a transmission information of which transmission power has been adjusted may be represented as a diagonal matrix P as follows.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Meanwhile, a wireless communication system may be divided into a frequency division duplex (FDD) method and a time division duplex (TDD) method. Based on the FDD method, an uplink transmission and a downlink transmission are progressed in different frequency bands. Based on the TDD method, the uplink transmission and the downlink transmission are performed in the same frequency band at different times. A channel response of a TDD method is actually reciprocal. This means the downlink channel response and the uplink channel response are almost same in the current frequency domain. Therefore, there is an advantage in that the downlink channel response in the wireless communication system based on the TDD may be obtained from the uplink channel response. In the TDD method, as the whole frequency domain is divided into an uplink transmission and a downlink transmission by time-share, it is not available to perform the downlink transmission by a terminal and the uplink transmission by a UE at the same time. In the TDD system in which an uplink transmission and a downlink transmission are divided by a subframe unit, the uplink transmission and the downlink transmission are performed in different subframes.

Hereinafter, the LTE system is described in further detail.

Figure 3:
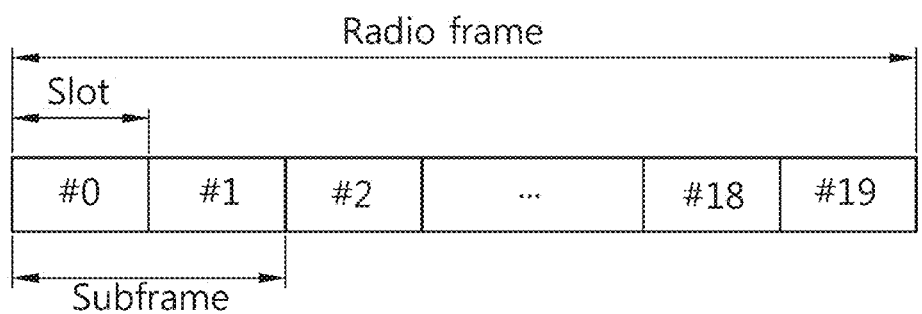
FIG. 3 illustrates the architecture of a radio frame according to FDD in 3GPP LTE.

FIG. 3 illustrates the architecture of a radio frame according to FDD in 3GPP LTE.

Referring to FIG. 3, the radio frame is composed of ten subframes, and one subframe is composed of two slots. The slots in the radio frame are designated by slot numbers from 0 to 19. The time at which one subframe is transmitted is referred to as a transmission time interval (TTI). The TTI may be called as a scheduling unit for data transmission. For example, the length of one radio frame may be 10 ms, the length of one subframe may be 1 ms, and the length of one slot may be 0.5 ms.

The structure of the radio frame is merely an example, and the number of subframes included in the radio frame, the number of slots included in the subframe, etc. may be variously modified.

Figure 4:
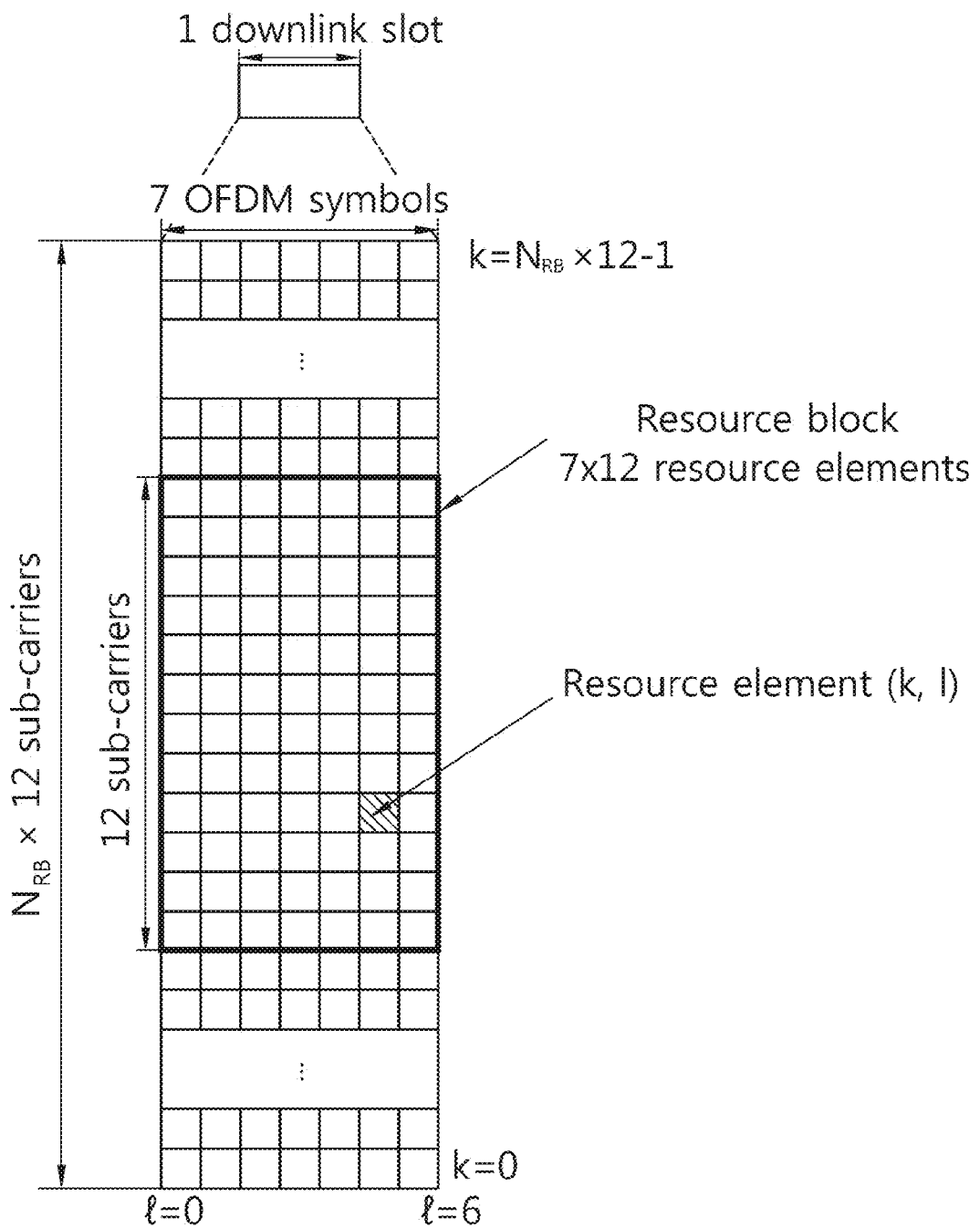
FIG. 4 illustrates an example resource grid for one uplink or downlink slot in 3GPP LTE.

FIG. 4 illustrates an example resource grid for one uplink or downlink slot in 3GPP LTE.

Referring to FIG. 4, the uplink slot includes a plurality of OFDM (orthogonal frequency division multiplexing) symbols in the time domain and NUL resource blocks (RBs) in the frequency domain. OFDM symbol is to represent one symbol period, and depending on system, may also be denoted SC-FDMA symbol, OFDM symbol, or symbol period. The resource block is a unit of resource allocation and includes a plurality of sub-carriers in the frequency domain. The number of resource blocks included in the uplink slot, i.e., NUL, is dependent upon an uplink transmission bandwidth set in a cell. Each element on the resource grid is denoted resource element.

Here, by way of example, one resource block includes 7×12 resource elements that consist of seven OFDM symbols in the time domain and 12 sub-carriers in the frequency domain. However, the number of sub-carriers in the resource block and the number of OFDM symbols are not limited thereto. The number of OFDM symbols in the resource block or the number of sub-carriers may be changed variously. In other words, the number of OFDM symbols may be varied depending on the above-described length of CP. In particular, 3GPP LTE defines one slot as having seven OFDM symbols in the case of CP and six OFDM symbols in the case of extended CP.

In 3GPP LTE, the resource grid for one uplink slot shown in FIG. 4 may also apply to the resource grid for the downlink slot.

Figure 5:
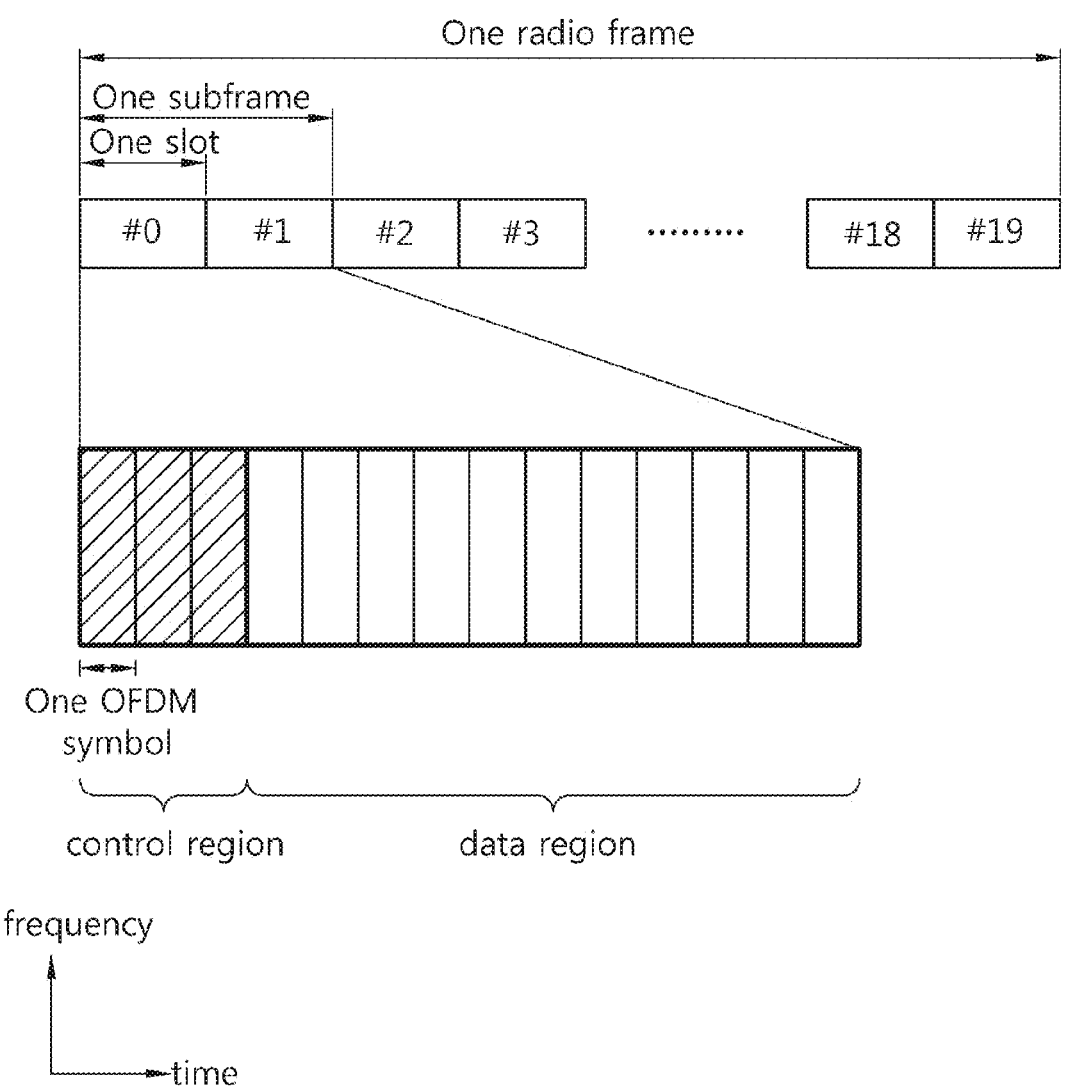
FIG. 5 illustrates the architecture of a downlink sub-frame.

FIG. 5 illustrates the architecture of a downlink sub-frame.

For this, 3GPP TS 36.211 V10.4.0 (2011-12) "Evolved Universal Terrestrial Radio Access (E-UTRA); Physical Channels and Modulation (Release 10)", Ch. 4 may be referenced.

The radio frame includes 10 sub-frames indexed 0 to 9. One sub-frame includes two consecutive slots. Accordingly, the radio frame includes 20 slots. The time taken for one sub-frame to be transmitted is denoted TTI (transmission time interval). For example, the length of one sub-frame may be 1 ms, and the length of one slot may be 0.5 ms.

One slot may include a plurality of OFDM (orthogonal frequency division multiplexing) symbols in the time domain. OFDM symbol is merely to represent one symbol period in the time domain since 3GPP LTE adopts OFDMA (orthogonal frequency division multiple access) for downlink (DL), and the multiple access scheme or name is not limited thereto. For example, the OFDM symbol may be referred to as SC-FDMA (single carrier-frequency division multiple access) symbol or symbol period.

Here, one slot includes seven OFDM symbols, by way of example. However, the number of OFDM symbols included in one slot may vary depending on the length of CP (cyclic prefix). That is, as described above, according to 3GPP TS 36.211 V10.4.0, one slot includes seven OFDM symbols in the normal CP and six OFDM symbols in the extended CP.

Resource block (RB) is a unit for resource allocation and includes a plurality of sub-carriers in one slot. For example, if one slot includes seven OFDM symbols in the time domain and the resource block includes 12 sub-carriers in the frequency domain, one resource block may include 7×12 resource elements (REs).

The DL (downlink) sub-frame is split into a control region and a data region in the time domain. The control region includes up to first three OFDM symbols in the first slot of the sub-frame. However, the number of OFDM symbols included in the control region may be changed. A PDCCH (physical downlink control channel) and other control channels are assigned to the control region, and a PDSCH is assigned to the data region.

As set forth in 3GPP TS 36.211 V10.4.0, the physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

The PCFICH transmitted in the first OFDM symbol of the sub-frame carries CIF (control format indicator) regarding the number (i.e., size of the control region) of OFDM symbols used for transmission of control channels in the sub-frame. The wireless device first receives the CIF on the PCFICH and then monitors the PDCCH.

Unlike the PDCCH, the PCFICH is transmitted through a fixed PCFICH resource in the sub-frame without using blind decoding.

The PHICH carries an ACK (positive-acknowledgement)/NACK (negative-acknowledgement) signal for a UL HARQ (hybrid automatic repeat request). The ACK/NACK signal for UL (uplink) data on the PUSCH transmitted by the wireless device is sent on the PHICH.

The PBCH (physical broadcast channel) is transmitted in the first four OFDM symbols in the second slot of the first sub-frame of the radio frame. The PBCH carries system information necessary for the wireless device to communicate with the base station, and the system information transmitted through the PBCH is denoted MIB (master information block). In comparison, system information transmitted on the PDSCH indicated by the PDCCH is denoted SIB (system information block).

The control information transmitted through the PDCCH is denoted downlink control information (DCI). The DCI may include resource allocation of PDSCH (this is also referred to as DL (downlink) grant), resource allocation of PUSCH (this is also referred to as UL (uplink) grant), a set of transmission power control commands for individual UEs in some UE group, and/or activation of VoIP (Voice over Internet Protocol).

In 3GPP LTE, blind decoding is used for detecting a PDCCH. The blind decoding is a scheme of identifying whether a PDCCH is its own control channel by demasking a desired identifier to the CRC (cyclic redundancy check) of a received PDCCH (this is referred to as candidate PDCCH) and checking a CRC error. The base station determines a PDCCH format according to the DCI to be sent to the wireless device, then adds a CRC to the DCI, and masks a unique identifier (this is referred to as RNTI (radio network temporary identifier) to the CRC depending on the owner or purpose of the PDCCH.

According to 3GPP TS 36.211 V10.4.0, the uplink channels include a PUSCH, a PUCCH, an SRS (Sounding Reference Signal), and a PRACH (physical random access channel).

Figure 6:
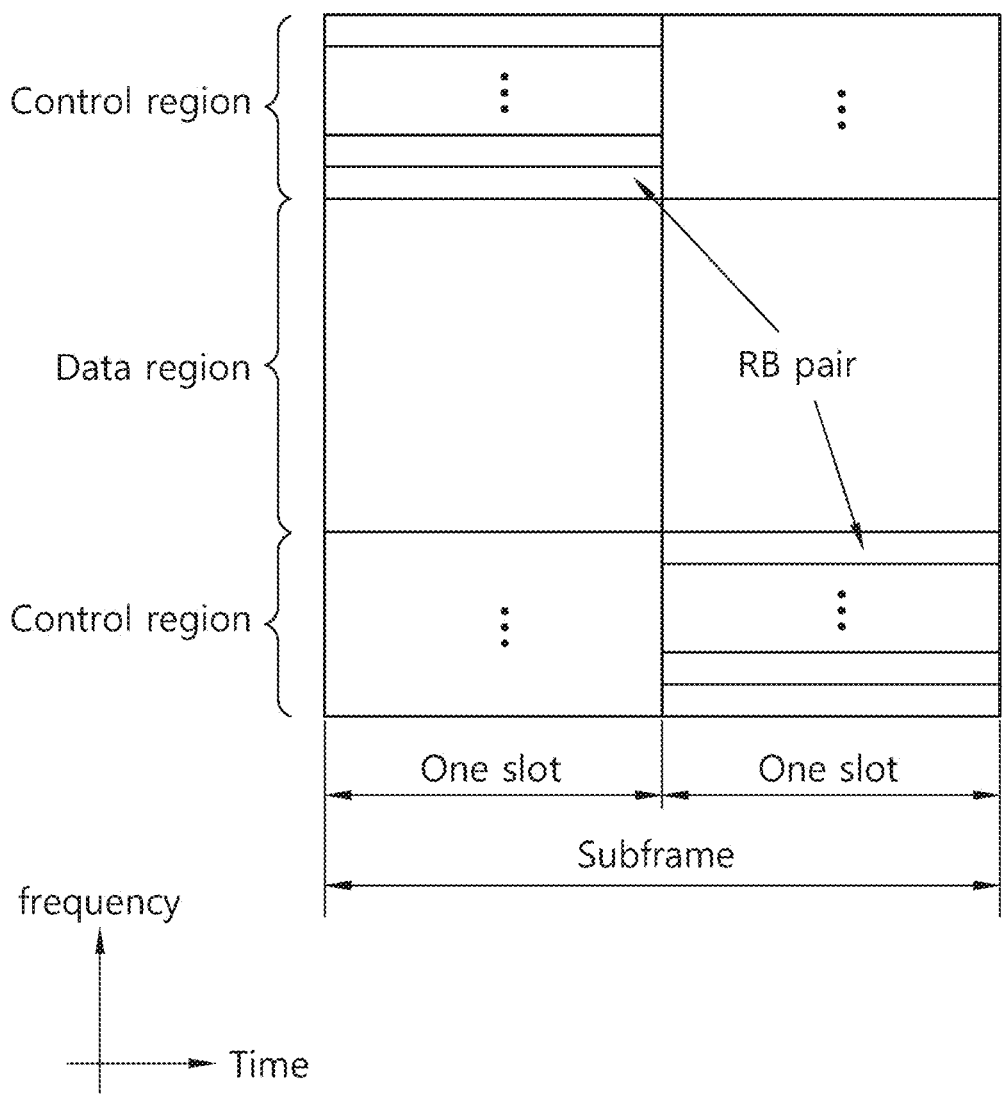
FIG. 6 illustrates the architecture of an uplink sub-frame in 3GPP LTE.

FIG. 6 illustrates the architecture of an uplink sub-frame in 3GPP LTE.

Referring to FIG. 6, the uplink sub-frame may be separated into a control region and a data region in the frequency domain. The control region is assigned a PUCCH (physical uplink control channel) for transmission of uplink control information. The data region is assigned a PUSCH (physical uplink shared channel) for transmission of data (in some cases, control information may also be transmitted).

The PUCCH for one terminal is assigned in resource block (RB) pair in the sub-frame. The resource blocks in the resource block pair take up different sub-carriers in each of the first and second slots. The frequency occupied by the resource blocks in the resource block pair assigned to the PUCCH is varied with respect to a slot boundary. This is referred to as the RB pair assigned to the PUCCH having been frequency-hopped at the slot boundary. The terminal may obtain a frequency diversity gain by transmitting uplink control information through different sub-carriers over time.

Figure 7:
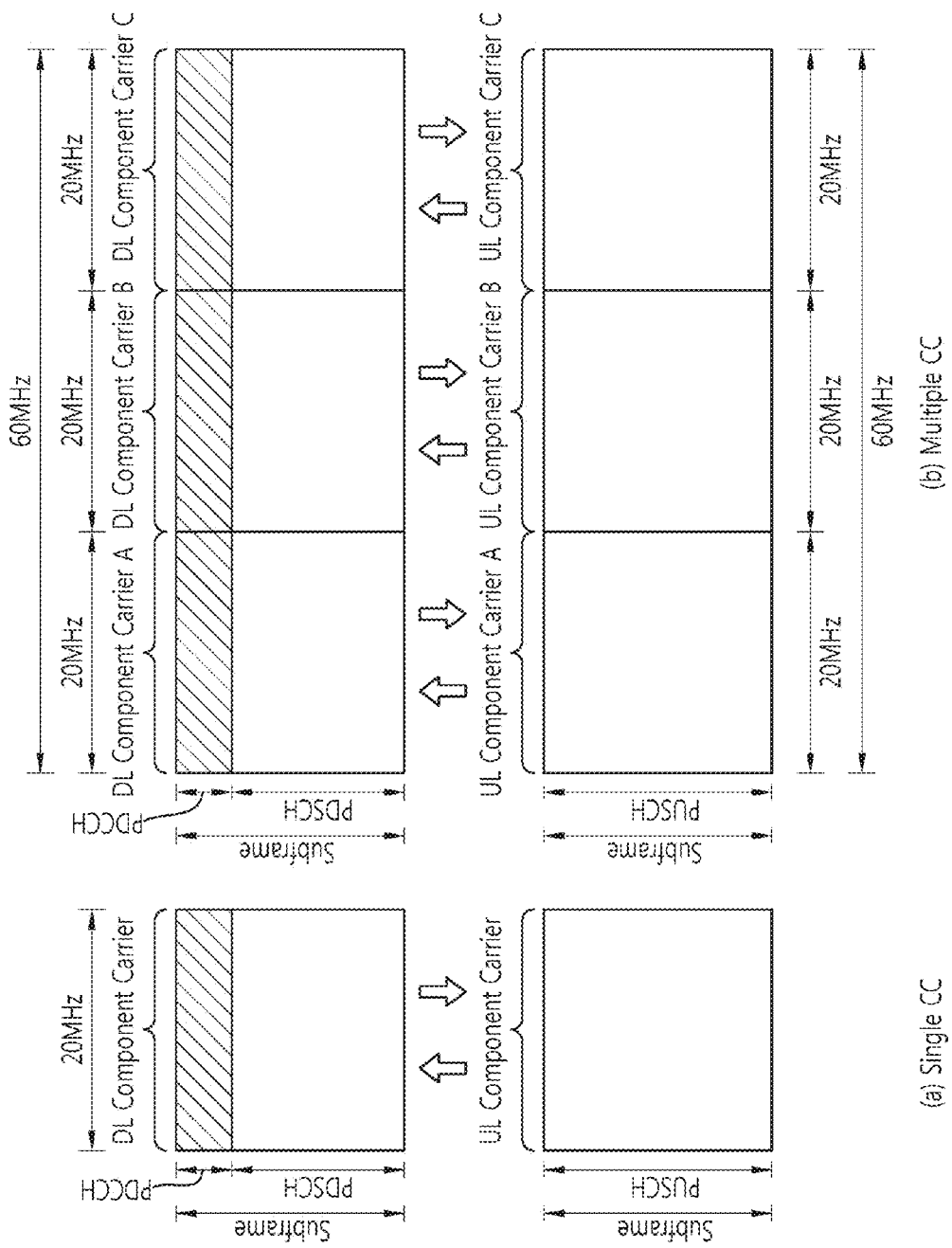
FIG. 7 illustrates an example of comparison between a single carrier system and a carrier aggregation system.

FIG. 7 illustrates an example of comparison between a single carrier system and a carrier aggregation system.

Referring to FIG. 7(a), a typical FDD wireless communication system supports one carrier for uplink and downlink. In this case, the carrier may have various bandwidths, but only one carrier is assigned to the user equipment.

In other words, in the typical FDD wireless communication system, data transmission and reception is carried out through one downlink band and one uplink band corresponding thereto. The bit stream and the user equipment transmit and receive control information and/or data scheduled for each sub-frame. The data is transmitted/received through the data region configured in the uplink/downlink sub-frame, and the control information is transmitted/received through the control region configured in the uplink/downlink sub-frame. For this, the uplink/downlink sub-frame carries signals through various physical channels. Although the description in connection with FIG. 7 primarily focuses on the FDD scheme for ease of description, the foregoing may be applicable to the TDD scheme by separating the radio frame for uplink/downlink in the time domain.

As shown in FIG. 7(a), data transmission/reception performed through one downlink band and one uplink band corresponding to the downlink band is referred to as a single carrier system.

Such single carrier system may correspond to an example of communication in the LTE system. Such 3GPP LTE system may have an uplink bandwidth and a downlink bandwidth that differ from each other, but supports up to 20 MHz.

Meanwhile, a high data transmission rate is demanded. The most fundamental and stable solution to this is to increase bandwidth.

However, the frequency resources are presently saturated, and various technologies are partially being in use in a wide range of frequency band. For such reason, as a method for securing a broad bandwidth to satisfy the demand for higher data transmission rate, each scattered band may be designed to meet basic requirements for being able to operate an independent system, and carrier aggregation (CA) whose concept is to bundle up multiple bands to a single system has been introduced.

That is, the carrier aggregation (CA) system means a system that constitutes a broadband by gathering one or more carriers each of which has a bandwidth narrower than the targeted broadband when supporting a broadband in the wireless communication system.

Such carrier aggregation (CA) technology is also adopted in the LTE-advanced (hereinafter, 'LTE-A'). The carrier aggregation (CA) system may also be referred to as a multiple-carrier system or bandwidth aggregation system.

In the carrier aggregation (CA) system, a user equipment may simultaneously transmit or receive one or more carriers depending on its capabilities. That is, in the carrier aggregation (CA) system, a plurality of component carriers (CCs) may be assigned to a user equipment. As used herein, the term "component carrier" refers to a carrier used in a carrier aggregation system and may be abbreviated to a carrier. Further, the term "component carrier" may mean a frequency block for carrier aggregation or a center frequency of a frequency block in the context and they may be interchangeably used.

FIG. 7(b) may correspond to a communication example in an LTE-A system.

Referring to FIG. 7(b), in case, e.g., three 20 MHz component carriers are assigned to each of uplink and downlink, the user equipment may be supported with a 60 MHz bandwidth. Or, for example, if five CCs are assigned as granularity of the unit of carrier having a 20 MHz bandwidth, up to 100 MHz may be supported. FIG. 7(b) illustrates an example in which the bandwidth of an uplink component carrier is the same as the bandwidth of a downlink component carrier for ease of description. However, the bandwidth of each component carrier may be determined independently. When aggregating one or more component carriers, a targeted component carrier may utilize the bandwidth used in the existing system for backward compatibility with the existing system. For example, in a 3GPP LTE system, bandwidths of 1.4 MHz, 3 MHz, 5 MHz, 10 MHz, 15 MHz and 20 MHz may be supported. Accordingly, the bandwidth of an uplink component carrier may be constituted like 5 MHz(UL CC0)+20 MHz (UL CC1)+20 MHz(UL CC2)+20 MHz(UL CC3)+5 MHz (UL CC4), for example. However, without consideration of backward compatibility, a new bandwidth may be defined rather the existing system bandwidth being used, to constitute a broadband.

FIG. 7(b) illustrates an example in which the number of uplink component carriers is symmetric with the number of downlink component carriers for ease of description. As such, when the number of uplink component carriers is the same as the number of downlink component carriers is denoted symmetric aggregation, and when the number of uplink component carriers is different from the number of downlink component carriers is denoted asymmetric aggregation.

The asymmetric carrier aggregation may occur due to a restriction on available frequency bands or may be artificially created by a network configuration. As an example, even when the entire system band comprises N CCs, the frequency band where a particular user equipment may perform reception may be limited to M (<N) CCs. Various parameters for carrier aggregation may be configured cell-specifically, UE group-specifically, or UE-specifically.

Meanwhile, carrier aggregation systems may be classified into contiguous carrier aggregation systems where each carrier is contiguous with another and non-contiguous carrier aggregation systems where each carrier is spaced apart from another. A guard band may be present between the carriers in the contiguous carrier aggregation system. Hereinafter, simply referring to a multi-carrier system or carrier aggregation system should be understood as including both when component carriers are contiguous and when component carriers are non-contiguous.

Meanwhile, the concept of cell as conventionally appreciated is varied by the carrier aggregation technology. In other words, according to the carrier aggregation technology, the term "cell" may mean a pair of a downlink frequency resource and an uplink frequency resource. Or, the cell may mean a combination of one downlink frequency resource and an optional uplink frequency resource.

In other words, according to the carrier aggregation technology, one DL CC or a pair of UL CC and DL CC may correspond to one cell. Or, one cell basically includes one DL CC and optionally includes a UL CC. Accordingly, a user equipment communicating with a bit stream through a plurality of DL CCs may be said to receive services from a plurality of serving cells. In this case, although downlink is constituted of a plurality of DL CCs, uplink may be used by only one CC. In such case, the user equipment may be said to receive services from a plurality of serving cells for downlink and to receive a service from only one serving cell for uplink.

Meanwhile, in order for packet data to be transmitted/received through a cell, configuration for a particular cell should be completed. Here, the term "configuration" means the state where system information necessary for data transmission/reception on a corresponding cell is completely received. For example, the configuration may include the overall process of receiving common physical layer parameters necessary for data transmission/reception, MAC (media access control) layer parameters, or parameters necessary for a particular operation in RRC layer. The configuration-completed cell is in the state where packet transmission/reception is possible simply when information indicating that packet data may be transmitted is received.

The configuration-completed cell may be left in activation or deactivation state. Here, the term "activation" refers to data transmission or reception being performed or being ready. The UE may monitor or receive a control channel (PDCCH) or data channel (PDSCH) of an activated cell in order to identify resources (which may be frequency or time) assigned thereto.

Transmission or reception with a deactivated cell is impossible, while measurement or transmission/reception of least information is possible. The user equipment may receive system information (SI) necessary for receiving packets from a deactivated cell. In contrast, the user equipment does not monitor or receive the control channel (PDCCH) and data channel (PDSCH) of deactivated cells to identify resources (which may be frequency or time) assigned thereto.

In accordance with carrier aggregation technology, thus, activation/deactivation of a component carrier may be the same in concept as activation/deactivation of a serving cell. For example, assuming that serving cell 1 comprises DL CC1, activation of serving cell 1 means activation of DL CC1. Assuming that serving cell 2 is configured so that DL CC2 is connected with UL CC2, activation of serving cell 2 means activation of DL CC2 and UL CC2. In that regard, each component carrier may correspond to a serving cell.

On the other hand, a change in the concept of serving cell as conventionally understood by the carrier aggregation technology leads to primary cells and secondary cells being separated from each other.

The primary cell refers to a cell operating in a primary frequency and means a cell where the user equipment performs an initial connection establishment procedure or connection re-establishment procedure with a bit stream or a cell designated so during the course of handover.

The secondary cell means a cell operating in a secondary frequency, and is configured once an RRC connection is established and is used to provide additional radio resources.

The PCC (primary component carrier) means a component carrier (CC) corresponding to the primary cell. The PCC means a CC where the user equipment initially achieves connection (or RRC connection) with the base station among various CCs. The PCC is a special CC that is in charge of connection (or RRC connection) for signaling regarding multiple CCs and that manages UE context that is connection information relating to the UE. Further, the PCC, in case the PCC achieves connection with the UE so that it is in RRC connected mode, always remains in activated state. The downlink component carrier corresponding to the primary cell is referred to as a downlink primary component carrier (DL PCC), and the uplink component carrier corresponding to the primary cell is referred to as an uplink primary component carrier (UL PCC).

The SCC (secondary component carrier) means a CC corresponding to the secondary cell. That is, the SCC is a CC assigned to the user equipment, which is not the PCC, and the SCC is an extended carrier for the user equipment to assign additional resources other than the PCC. The SCC may stay in activated state or deactivated state. The downlink component carrier corresponding to the secondary cell is referred to as a downlink secondary component carrier (DL SCC), and the uplink component carrier corresponding to the secondary cell is referred to as an uplink secondary component carrier (UL SCC).

The primary cell and the secondary cell have the following features.

First, the primary cell is used for transmission of a PUCCH. Second, the primary cell always remain activated while the secondary cell switches between activation/deactivation depending on particular conditions. Third, when the primary cell experiences radio link failure (hereinafter, "RLF"), the RRC reconnection is triggered. Fourth, the primary cell may be varied by a handover procedure that comes together with security key changing or an RACH (Random Access CHannel) procedure. Fifth, NAS (non-access stratum) information is received through the primary cell. Sixth, in the case of an FDD system, the primary cell is constituted of a pair of DL PCC and UL PCC. Seventh, a different component carrier may be set as the primary cell for each user equipment. Eighth, primary cells may be exchanged only by a handover, cell selection/cell reselection process. In adding a new secondary cell, RRC signaling may be used to transmit system information of the dedicated secondary cell.

As described above, the carrier aggregation system may support a plurality of component carriers (CCs), i.e., a plurality of serving cells, unlike the single carrier system.

Such carrier aggregation system may support cross-carrier scheduling. The cross-carrier scheduling is a scheduling method that allows for resource allocation of a PDSCH transmitted through other component carrier through a PDCCH transmitted through a particular component carrier and/or resource allocation of a PUSCH transmitted through other component carrier than the component carrier basically linked with the particular component carrier. That is, a PDCCH and a PDSCH may be transmitted through different downlink CCs, and a PUSCH may be transmitted through an uplink CC other than an uplink CC linked with a downlink CC through which a PDCCH including a UL grant is transmitted. As such, the cross-carrier scheduling-supportive system requires a carrier indicator indicating a DL CC/UL CC through which a PDSCH/PUSCH through which a PDCCH provides control information is transmitted. The field containing such carrier indicator is hereinafter referred to as a carrier indication field (CIF).

The carrier aggregation system supportive of cross-carrier scheduling may include a carrier indication field (CIF) in the conventional DCI (downlink control information) format. A cross-carrier scheduling-supportive system, e.g., an LTE-A system, adds a CIF to the existing DCI format (i.e., DCI format used in LTE), so that it may be extended with three bits, and it may reuse the existing coding scheme, resource allocation scheme (i.e., CCE-based resource mapping) for the PDCCH structure.

Figure 8:
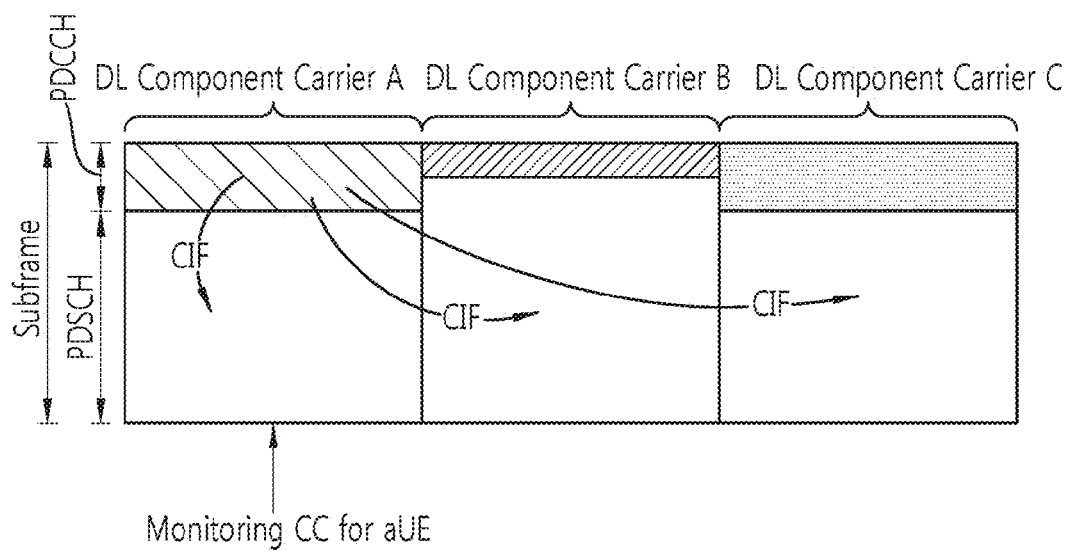
FIG. 8 illustrates an example in which three DL CCs (DL CC A, DL CC B, and DL CC C) are aggregated, and DL CC A is set as a PDCCH monitoring DL CC.

FIG. 8 exemplifies cross-carrier scheduling in the carrier aggregation system.

Referring to FIG. 8, the base station may configure a PDCCH monitoring DL CC (monitoring CC) set. The PDCCH monitoring DL CC set consists of some of all of the aggregated DL CCs, and if cross-carrier scheduling is configured, the user equipment performs PDCCH monitoring/decoding only on the DL CCs included in the PDCCH monitoring DL CC set. In other words, the base station transmits a PDCCH for PDSCH/PUSCH that is subject to scheduling only through the DL CCs included in the PDCCH monitoring DL CC set. The PDCCH monitoring DL CC set may be configured UE-specifically, UE group-specifically, or cell-specifically.

FIG. 8 illustrates an example in which three DL CCs (DL CC A, DL CC B, and DL CC C) are aggregated, and DL CC A is set as a PDCCH monitoring DL CC. The user equipment may receive a DL grant for the PDSCH of DL CC A, DL CC B, and DL CC C through the PDCCH of DL CC A. The DCI transmitted through the PDCCH of DL CC A contains a CIF so that it may indicate which DL CC the DCI is for.

Figure 9:
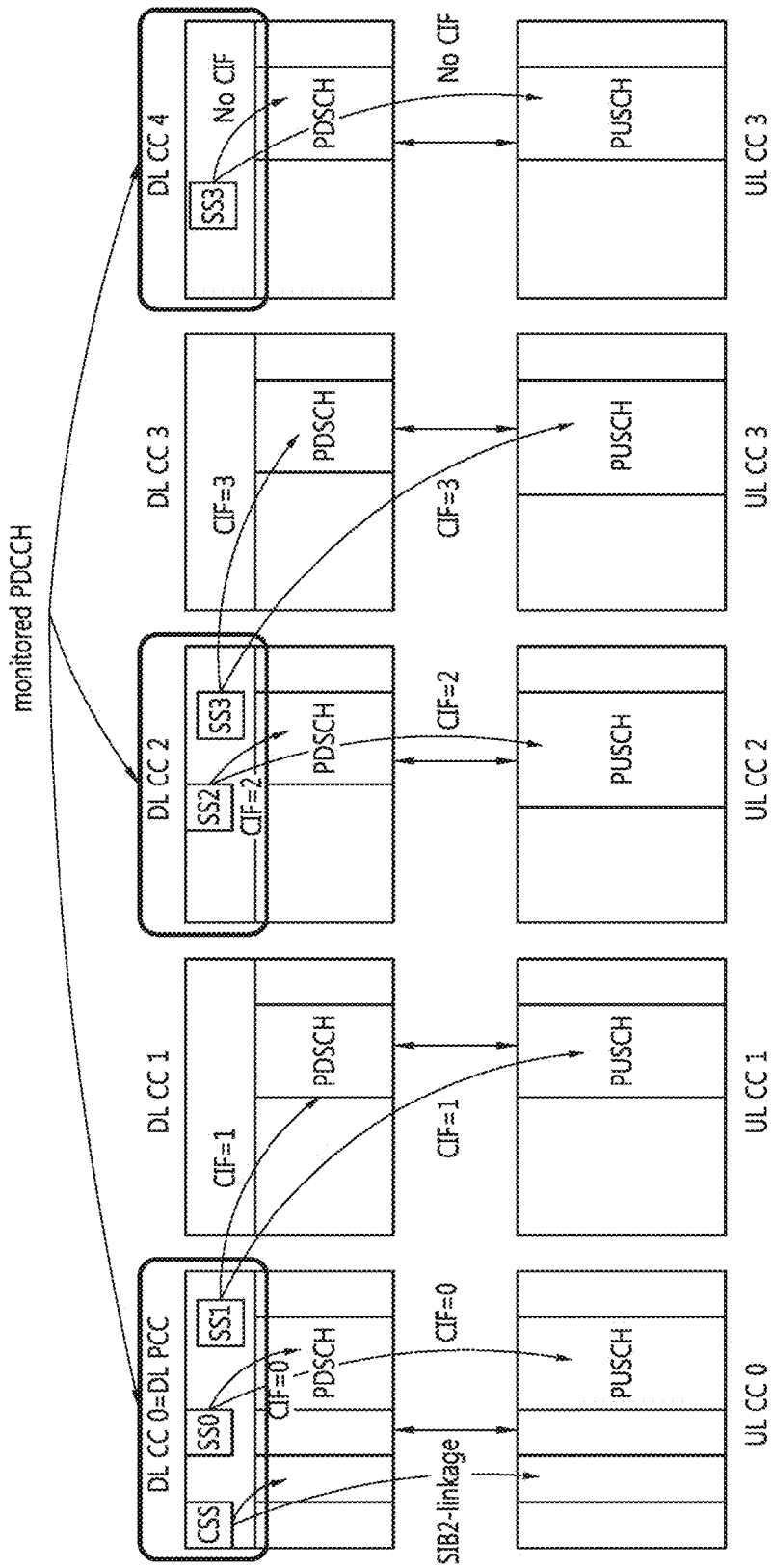
FIG. 9 illustrates an example of scheduling performed when cross-carrier scheduling is configured in a cross-carrier scheduling.

FIG. 9 illustrates an example of scheduling performed when cross-carrier scheduling is configured in a cross-carrier scheduling.

Referring to FIG. 9, DL CC 0, DL CC 2, and DL CC 4 belong to a PDCCH monitoring DL CC set. The user equipment searches for DL grants/UL grants for DL CC 0 and UL CC 0 (UL CC linked to DL CC 0 via SIB 2) in the CSS of DL CC 0. The user equipment searches for DL grants/UL grants for DL CC 1 and UL CC 1 in SS 1 of DL CC 0. SS 1 is an example of USS. That is, SS 1 of DL CC 0 is a space for searching for a DL grant/UL grant performing cross-carrier scheduling.

Figure 10:
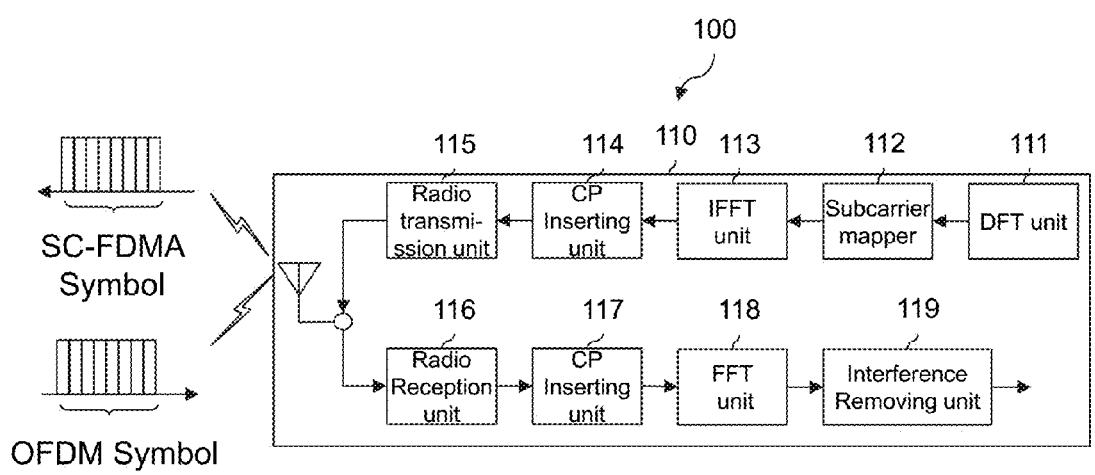
FIG. 10 is a block diagram representing a structure of an UE according to 3GPP LTE as an example.

FIG. 10 is a block diagram representing a structure of an UE according to 3GPP LTE as an example.

In the long-term evolution (LTE) or LTE-A, an orthogonal frequency division multiplexing (OFDM) is used in downlink, but a single-carrier (SC)-FDMA (similar to OFDM) is used in uplink.

FDMA may be said to be DFT-s OFDM (DFT-spread OFDM). When using the SC-FDMA transmission scheme, the non-linear distortion of power amplifier may be avoided, thus allowing power consumption-limited user equipment to enjoy increased transmission power efficiency. Accordingly, user throughput may be increased.

SC-FDMA is similar to OFDM in that SC-FDMA also employs FFT (Fast Fourier Transform) and IFFT (Inverse-FFT). However, the problem with the existing OFDM transmitters is that signals over each sub-carrier on frequency axis are converted to signals on time axis by IFFT. That is, IFFT is in the form of performing the same parallel operation, thus causing an increase in PAPR (Peak to Average Power Ratio). To prevent such increase in PAPR, SC-FDMA, unlike OFDM, performs IFFT after DFT spreading. In other words, the transmission scheme of performing IFFT after DFT spreading is referred to as SC-FDMA. Thus, SC-FDMA is also called DFT spread OFDM (DFT-s-OFDM).

Such advantages of SC-FDMA led to being robust for multi-path channels thanks to similar structure to OFDM while enabling efficient use of power amplifier by fundamentally solving the problem of existing OFDM that OFDM causes increased PAPR due to IFFT operation.

Referring to FIG. 10, a UE 100 includes a RF unit 110. The RF unit 110 includes a transmission terminal, that is, a discrete Fourier transform (DFT) unit 111, a subcarrier mapper 112, an IFFT unit 113 and a CP insertion unit 114, and a radio transmission unit 115. The transmission terminal of the RF unit 110 further includes, for example, a scramble unit (not shown), a modulation mapper (not shown), a layer mapper (not shown) and a layer permutator (not shown), and those are arranged ahead of the DFT unit 111. That is, as previously described, in order to prevent an increase of PAPR, the transmission terminal of the RF unit 110 has the information gone through the DFT 111 before signals mapped to a subcarrier. The signal that is spread (or precoded in the same meaning) by the DFT 111 is mapped to a subcarrier through a subcarrier mapper 112, and after that, made into a signal on the time axis passing through an inverse fast Fourier transform (IFFT) unit again.

That is, due to the correlation among the DFT unit 111, the subcarrier mapper 112 and the IFFT unit 113, peak-to-average power ratio (PAPR) of later time domain signal of the IFFT unit 113 is not significantly increased in the SC-FDMA, different from the case of the OFDM, and accordingly, it is beneficial in the aspect of transmission power efficiency. That is, in the SC-FDMA, the PAPR or cubic metric (CM) may be decreased.

The DFT unit 111 outputs complex-valued symbols by performing DFT for the input symbols. For example, when $N_{tx}$ symbols are inputted ($N_{tx}$ is natural numbers), the size of DFT is $N_{tx}$. The DFT unit 111 may be called a transform precoder. The subcarrier mapper 112 maps the complex-valued symbols to each subcarrier in the frequency domain. The complex-valued symbols may be mapped to the resource elements that correspond to the resource blocks allocated for data transmission. The subcarrier mapper 112 may be called a resource element mapper. The IFFT unit 113 outputs baseband signal for data which is a time domain signal by performing IFFT for the inputted symbol. The CP insertion unit 114 copies a part of a rear part of the baseband signal for data and inserts it into a front part of the baseband signal for data. The inter-symbol interference (ISI) and the inter-carrier interference (ICI) are prevented by inserting the CP, thereby orthogonality can be maintained even in multi-path channel.

Meanwhile, 3GPP is actively standardizing LTE-Advanced that is an advanced version of LTE and has adopted clustered DFT-s-OFDM scheme that permits non-contiguous resource allocation.

Clustered DFT-s OFDM transmission scheme is a modification of the conventional SC-FDMA transmission scheme, and is a method of mapping by dividing the data symbols that have passed through the precoder into a plurality of subblocks and separating them in the frequency domain. Some major features of the clustered DFT-s-OFDM scheme include enabling frequency-selective resource allocation so that the scheme may flexibly deal with a frequency selective fading environment.

In this case, the clustered DFT-s-OFDM scheme adopted as an uplink access scheme for LTE-advanced, unlike the conventional LTE uplink access scheme, i.e., SC-FDMA, permits non-contiguous resource allocation, so that uplink data transmitted may be split into several units of cluster.

In other words, while the LTE system is rendered to maintain single carrier characteristics in the case of uplink, the LTE-A system allows for non-contiguous allocation of DFT_precoded data on frequency axis or simultaneous transmission of PUSCH and PUCCH. In such case, the single carrier features are difficult to maintain.

On the other hand, the RF unit 110 may include a reception terminal, for example, a radio reception unit 116, a CP removing unit 117, a FFT unit 118 and an interference removing unit 119, etc. The radio reception unit 116, the CP removing unit 117 and the FFT unit 118 of the reception terminal perform reverse functions of the radio transmission unit 115 the CP insertion unit 114 and the IFFT unit 113.

The interference removing unit 119 removes or alleviates the interference included in the signal received.

Figure 11:
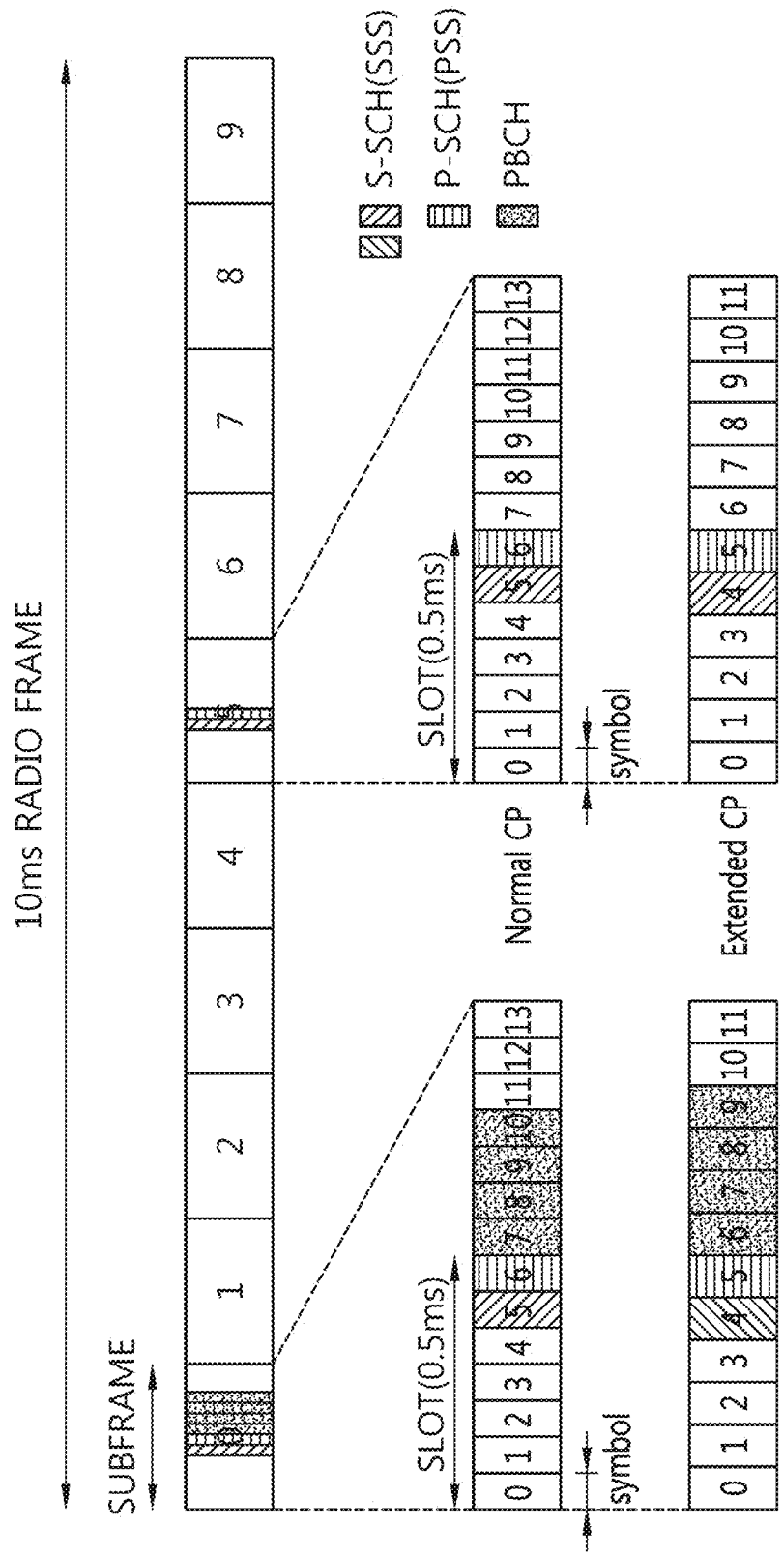
FIG. 11 illustrates a frame structure for transmitting a synchronization signal in a FDD frame defined in 3GPP LTE.

FIG. 11 illustrates a frame structure for transmitting a synchronization signal in a FDD frame defined in 3GPP LTE.

A slot number or a subframe number starts from zero. A UE may synchronize the time and frequency based on a synchronization signal received from a BS. The synchronization signal of 3GPP LTE-A is used for performing a cell search, and may be divided into a primary synchronization signal (PSS) and a secondary synchronization signal (SSS). For the synchronization signal of 3GPP LTE-A, section 6.11 of 3GPP TS V10.2.0 (2011-06) can be referred.

The PSS is used for acquiring OFDM symbol synchronization or slot synchronization, and is in relation to a physical-layer cell identity (PCI). And the SSS is used for acquiring frame synchronization. Also, the SSS is used for detecting a CP length and acquiring a physical-layer cell group ID.

The synchronization signal may be transmitted in subframe 0 and subframe 5 respectively in consideration of 4.6 ms, which is global system for mobile communication (GSM) frame length, in order to easily perform inter-RAT measurement, and the frame boundary may be detected through the SSS. In more detail, in the FDD system, the PSS is transmitted in the last OFDM symbol of $0^{th}$ slot and $10^{th}$ slot, and the SSS is transmitted in the OFDM symbol right ahead of the PSS.

The synchronization signal may transmit one of total 504 physical cell ID through the combination of 3 PSS and 168 SSS. A physical broadcast channel (PBCH) is transmitted in first 4 OFDM symbols of a first slot. The synchronization signal and the PBCH are transmitted within 6 RB in the middle of system bandwidth, and therefore, a UE may detect or decode regardless of the transmission bandwidth. The physical channel in which the PSS is transmitted is referred as P-SCH, and the physical channel in which the SSS is transmitted is referred to as S-SCH.

The transmission diversity scheme of synchronization signal uses only single antenna port, and is not defined separately in a standard. That is, a single antenna transmission or a transmission scheme transparent to UE (for example, precoding vector switching (PVS), time switched transmit diversity (TSTD), and cyclic delay diversity (CDD) may be used.

Figure 12:
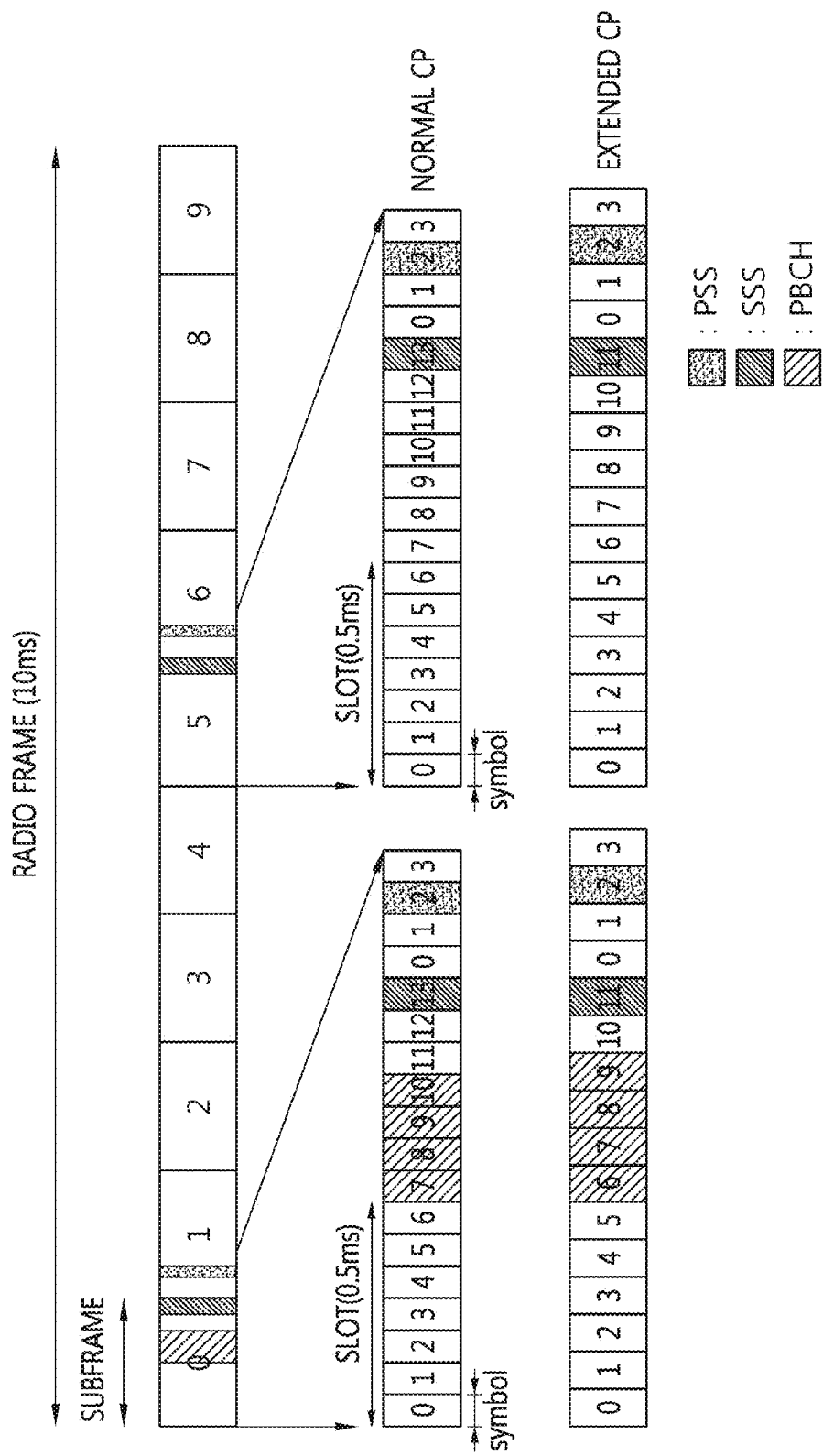
FIG. 12 illustrates an example of frame structure that transmits a synchronization signal in a TDD frame which is defined in 3GPP LTE.

FIG. 12 illustrates an example of frame structure that transmits a synchronization signal in a TDD frame which is defined in 3GPP LTE.

In a TDD frame, the PSS is transmitted in a third OFDM symbol of a third slot and a $13^{th}$ slot. The SSS is transmitted in the OFDM symbol which is 3 OFDM symbols ahead of the OFDM symbol in which the PSS is transmitted. The PBCH is first 4 OFDM symbols of a second slot in a first subframe.

FIG. 13 illustrates an example of a cell detection and a cell selection through a synchronization signal.

Figure 13A:
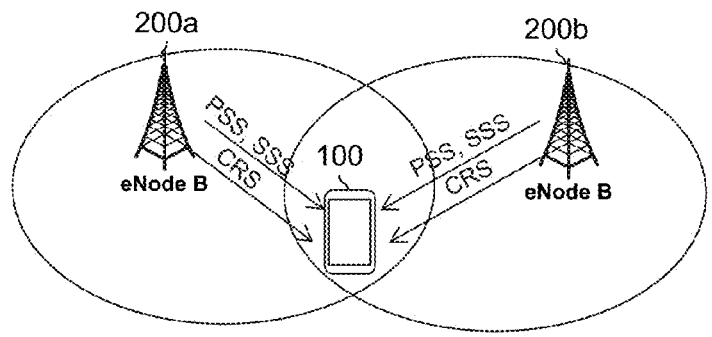
FIG. 13 illustrates an example of a cell detection and a cell selection through a synchronization signal.

Referring to FIG. 13(a), it is shown that a plurality of BSs, for example, a first BS 200a and a second BS 200b are existed neighboring each other, and a UE 100 is existed in an overlapped region therebetween.

First, each BS 200a and 200b transmits the PSS and the SSS as described above.

Subsequently, the UE may receive the PSS from each BS 200a and 200b, and acquire cell IDs for the cells configured by each BS.

Next, each BS 200a and 200b also transmits a cell-specific reference signal (CRS).

Figure 13B:
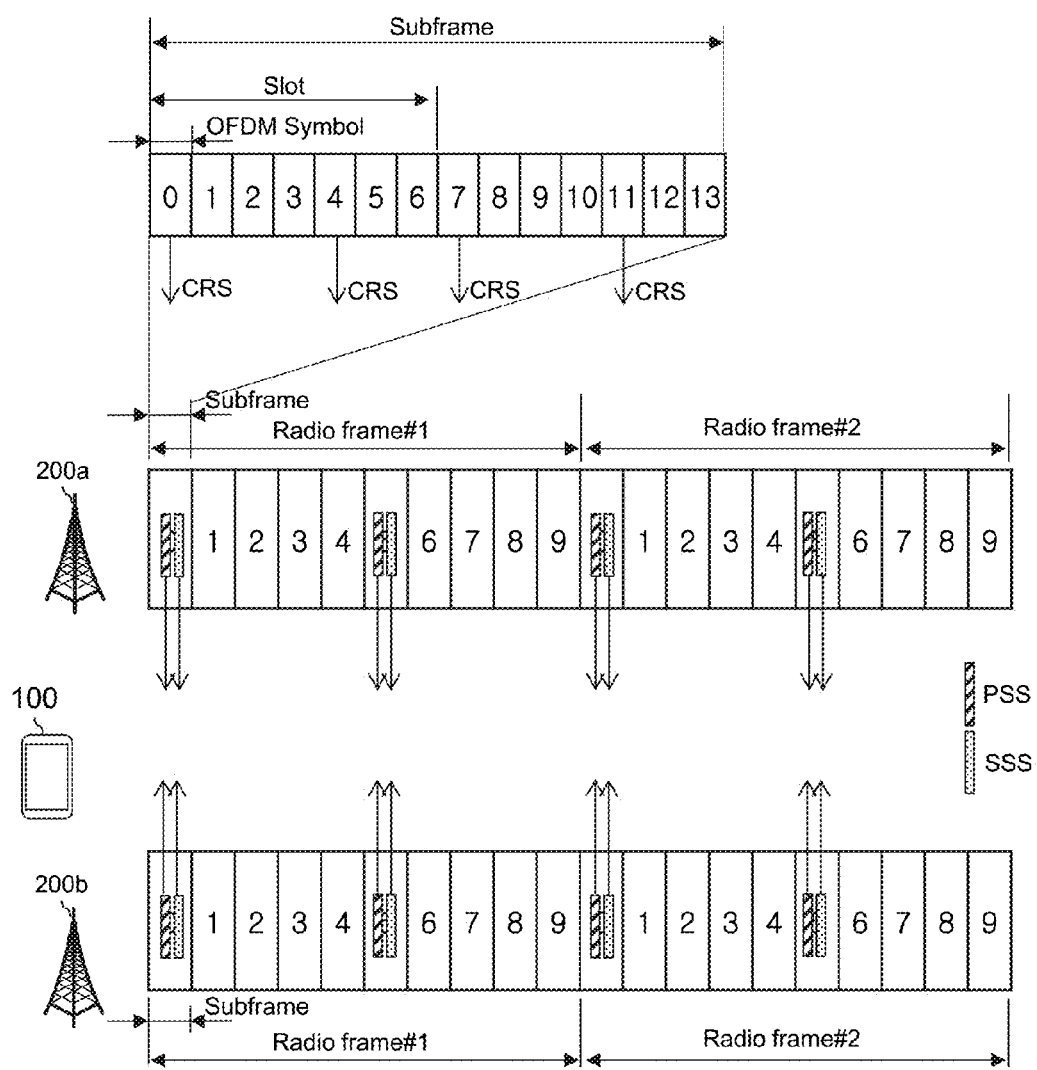

Herein, as known with reference to upper part of FIG. 13(b), as an example, the CRS may be transmitted on $0^{th}$, $4^{th}$, $7^{th}$ and $11^{th}$ OFDM symbols of a subframe.

In order to help understanding, what is CRS will be briefly described as follows.

In 3GPP LTE system, two sorts of downlink reference signal, the CRS (or also referred to as a common reference signal (RS)) and a dedicated RS (DRS, or also referred to as a UE-specific RS) are defined in order to facilitate unicast service.

The CRS is a reference signal that is shared by all UEs in a cell, and is used for acquiring the information of channel state and measuring handover.

A UE measures a reference signal received power (RSRP) and a reference signal received quality (RSRQ) by measuring the CRS, and notifies it to a BS. Also, the UE notifies feedback information such as channel quality information (CQI), pecoding matrix indicator (PMI) and rank indicator (RI), and the BS performs downlink frequency domain scheduling by using the feedback information received from the UE.

In order to transmit reference signals to the UE, the BS allocates resources by considering the amount of radio resource that will be allocated to reference signal, the exclusive location of a common reference signal and a dedicated reference signal, the location of a synchronization channel (SCH) and a broadcast channel (BCH) and density of a dedicated reference signal, etc.

In this time, if the more resources are allocated to the reference signal, higher channel estimation performance is obtainable, but the data transmission rate is relatively decreased. And if the less resource is allocated to the reference signal, higher data transmission rate is obtainable, but the density of reference signal becomes lower and the channel estimation performance may be deteriorated. Accordingly, it may be an important element in the system performance to allocate resources effectively for the reference signal considering the channel estimation and the data transmission rate.

Meanwhile, in 3GPP LTE system, the CRS is used for both objects of the channel information acquisition and the data decoding. Particularly, the CRS is transmitted in every subframe in wideband, and the CRS is transmitted for each antenna port of a BS. For example, if there are two transmission antennas in a BS, the CRS is transmitted through antenna ports 0 and 1, and if there are four transmission antennas, the CRS is transmitted through antenna ports 0 to 3 respectively.

Referring to FIG. 13(b) again, a UE 100 receives the CRS from each BS 200a and 200b, measures the RSRP and the RSRQ, and selects the cell that has better RSRP and RSRQ values.

As such, when a cell is selected, the UE 100 may receive the PBCH from a BS that configures the selected cell, and acquire system information through the PBCH. The system information may include, for example, the MIB above described. Also, the UE 100 receive the PDSCH from the BS that configures the selected cell, and acquire the SIB through the PDSCH.

Meanwhile, the UE 100 enters the RRC connection mode through the selected cell.

In summary, after the UE 100 selects a proper cell firstly, the UE 100 establishes the RRC connection in the corresponding cell, and registers the information of UE in a core network. Later, the UE 100 is shifted to RRC rest mode and remained. As such, the UE 100 that is shifted to RRC rest mode and remained (re)selects a cell as occasion demands, and looks up system information or paging information. As such, when the UE that is remained in the RRC rest mode is required to establish the RRC connection, the UE establishes the RRC connection with the RRC layer of E-UTRAN through the RRC connection procedure again, and shifted to the RRC connection mode. Herein, there are several cases that the UE in the RRC rest mode are required to establish the RRC connection again, for example, the case of requiring uplink data transmission on the reason that a user tries to call, otherwise the case of transmitting a response message when receiving a paging message from the E-UTRAN.

Meanwhile, in the next generation mobile communication system, multimedia broadcast/multicast service (MBMS) is suggested for broadcasting service.

Figure 14:
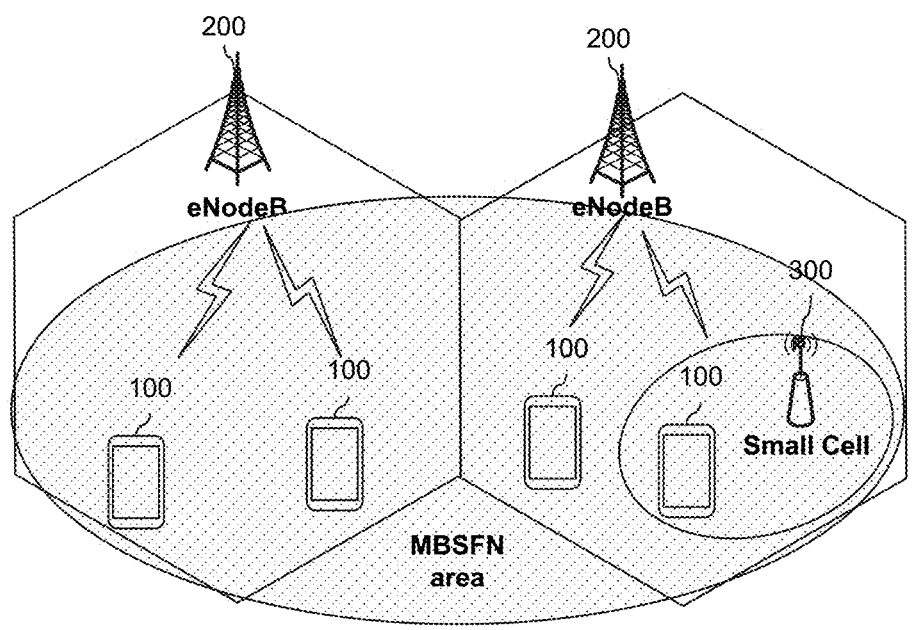
FIG. 14 illustrates an example of multimedia broadcast/multicast service (MBMS).

FIG. 14 illustrates an example of multimedia broadcast/multicast service (MBMS).

As known with reference to FIG. 14, within a service region, MBMS single frequency network (MBSFN) is applied such that a plurality of eNodeBs 200 transmit the same date at the same time and in the same form.

The MBMS is referred to provide streaming or background broadcast service or multicast service for a plurality of UEs by using downlink dedicated MBMS bearer service. In this time, the MBMS service may be divided into a multi-cell service that provides the same service for a plurality of cells and a single cell service that provides service for only one cell.

As such, a UE receives the plurality of cell services, the UE may receive the same transmission of the plurality of cell services transmitted from several cells with being combined in the MBMS single frequency network scheme.

Meanwhile, by signaling the subframe in which the MBMS is transmitted to the MBSFN subframe, the UE may know that.

Figure 15:
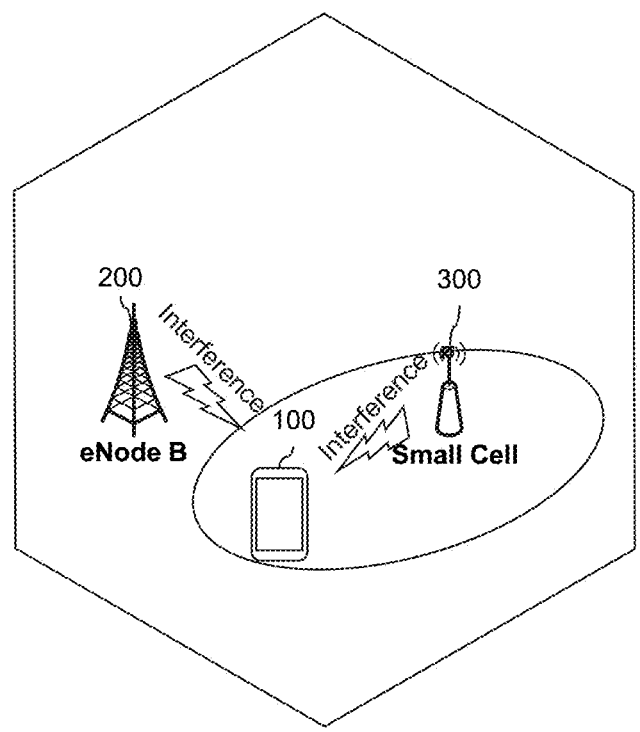
FIG. 15 illustrates a hetero-network that includes a macro cell and a small-scale cell.

FIG. 15 illustrates a hetero-network that includes a macro cell and a small-scale cell.

In the communication standard of the next generation such as 3GPP LTE-A, there is a discussion about a hetero-network in which small-scale cells that have a low transmission power in the existing macro cell coverage, such as a pico cell, a femto cell or a micro cell is existed with being overlapped.

Referring to FIG. 15, a macro cell may be overlapped with one or more micro cell. The service of macro cell is provided by a macro eNodeB (MeNB). In the present specification, the macro cell and the MeNB may be used with being mixed. A UE in connection with the macro cell may be referred to as a macro UE. The macro UE receives downlink signals from the MeNB and transmits uplink signals to the MeNB.

The small-scale cell is also referred to as a femto cell, a pico cell or a micro cell. The service of small-scale cell is provided by a pico eNodeB, a home eNodeB (HeNB), a relay node (RN), etc. For the convenience sake, the pico eNodeB, the home eNodeB (HeNB) and the relay node (RN) are collectively referred to as a HeNB. In this specification, the micro cell and the HeNB may be used with being mixed.

The small-scale cell may be divided into an open access (OA) cell and a closed subscriber group (CSG) cell according to accessibility. The OA cell signifies a cell in which a UE receives services anytime in case of need without separate access restriction. On the other hand, the CSG cell signifies a cell in which only a specific approved UE may receive services.

Since the macro cell and the small-scale cell are overlapped in the hetero-network, an inter-cell interference is a problem. As depicted, in case that a UE is located at a boundary between the macro cell and the small-scale cell, the downlink signal from the macro cell may act as interferences. Similarly, the downlink signal of the small-scale cell may also act as interferences.

As a detailed example, when the UE 100 that accesses the small-scale cell 300 is located at a boundary of the small-scale cell, the connection between the UE and the small-scale cell may be disconnected due to the interference from the macro cell 200. This signifies that the coverage of small-scale cell 300 becomes smaller than anticipated.

As another example, when the UE 100 that accesses the macro cell 200 is located in an area of the small-scale cell 300, the connection with the macro cell 200 may be disconnected due to the interference from the small-scale cell 300. This signifies that a radio shadow area occurs in the macro cell 200.

The most fundamental ways to solve the interference problem is to use different frequency between the hetero-networks. However, since a frequency is rare and expensive resource, the way of solution through frequency division is not welcomed by the service provider.

Accordingly, in 3GPP, it has been tried to solve the problem of inter-cell interference through the time division scheme.

According to this, in recent 3GPP, enhanced inter-cell interference coordination (eICIC) has been actively researched as a method of interference cooperation.

The time division scheme introduced in LTE Release-10 is called the enhanced inter-cell interference coordination (enhanced ICIC) as a meaning that it is an evolution in comparison with the existing frequency division scheme. In the scheme, it is defined that each cell that causes interference is referred to as an aggressor cell or a primary cell, and the cell that receives interference is referred to as a victim cell and a secondary cell. The aggressor cell or the primary cell stops data transmission in a specific subframe, thereby enabling a UE to maintain access with the victim cell or the secondary cell in the corresponding subframe. That is, in case that hetero-cells coexist, in this scheme, a cell stops transmission of signal for a while for a UE that receives significantly serious interference in a region, thereby not transmitting interference signal.

Meanwhile, the specific subframe in which the data transmission is stopped is called almost blank subframe (ABS), and in the subframe that corresponds to the ABS, any data is not transmitted except indispensible control information. The indispensible control information is, for example, a cell-specific reference signal (CRS). In current 3GPP LTE/LTE-A standard, the CRS is existed in $0^{th}$, $4^{th}$, $7^{th}$ and $11^{th}$ OFDM symbols in each subframe on time axis.

Figure 16A:
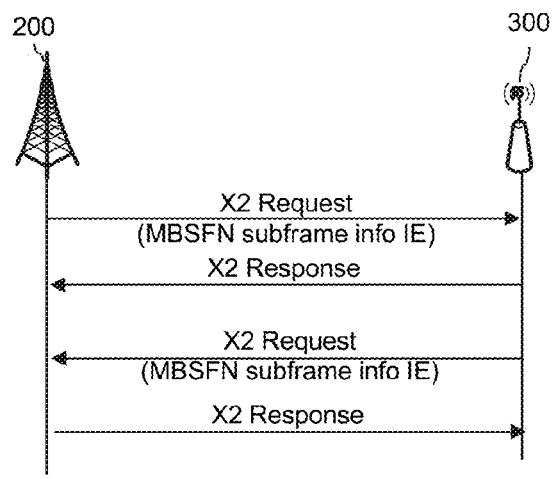
FIG. 16 illustrates an example of the enhanced inter-cell interference coordination (eICIC) to solve the problem of interference between BSs.
Figure 16B:
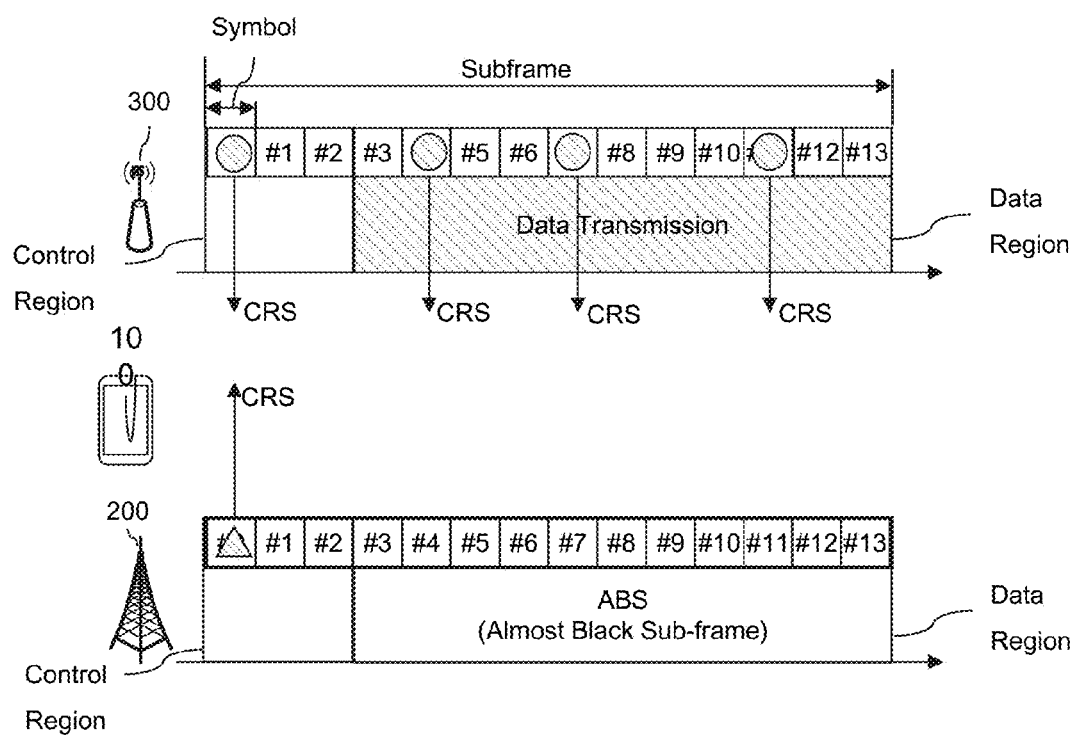

FIG. 16 illustrates an example of the enhanced inter-cell interference coordination (eICIC) to solve the problem of interference between BSs.

Referring to FIG. 16($a$), if the small-scale cell 300 is a pico cell, a macro cell, i.e., the eNodeB 200 and the small-scale cell 300 that corresponds to the pico cell exchange the MBSFN subframe information through X2 interface.

For example, the macro cell, i.e., the eNodeB 200 includes the information of MBSFN subframe and the information of subframe that operates as the ABS in MBSFN subframe Info information element (IE), and transmits it to the small-scale cell 300 that corresponds to the pico cell through a request message based on the X2 interface.

Meanwhile, the small-scale cell 300 that corresponds to the pico cell also includes the information of MBSFN subframe and the information of subframe that operates as the ABS in MBSFN subframe Info information element (IE), and transmits it through a request message based on the X2 interface.

In the meantime, as such, the macro cell, i.e., the eNodeB 200 and the small-scale cell 300 that corresponds to the pico cell may exchange MBSFN subframe information through the X2 interface.

However, if the small-scale cell 300 is a femto cell, the small-scale cell 300 that corresponds to the femto cell does not have X2 interface with the macro cell, i.e., the eNodeB 200. In this case, in order for the small-scale cell 300 that corresponds to the femto cell to acquire the information of MBSFN subframe of the macro cell, i.e., the eNodeB 200, the small-scale cell 300 that corresponds to the femto cell may acquire the MBSFN subframe information by acquiring the system information which is wirelessly broadcasted from the macro cell, i.e., the eNodeB 200. Or, the small-scale cell 300 that corresponds to the femto cell may also acquire the MBSFN subframe information of the macro cell, i.e., the eNodeB 200 from a control station of a core network.

Or, if the information of MBSFN subframe of the macro cell, i.e., the eNodeB 200 is fixed, the information of MBSFN subframe is applied to the small-scale cell 300 that corresponds to the femto cell through operations and management (OAM).

Referring to FIG. 16(*b*), a subframe is shown which the small-scale cell 300 that corresponds to the pico cell configures as the MBSFN. When the small-scale cell 300 that corresponds to the pico cell configures the corresponding subframe as the MBSFN and notifies it to the macro cell, i.e., the eNodeB 200, the macro cell 200 operates the corresponding subframe as the ABS.

In the data region of the corresponding subframe, the small-scale cell 300 that corresponds to the pico cell performs the data transmission, and the CRS is transmitted on the $0^{th}$, $4^{th}$, $7^{th}$, and $11^{th}$ symbols.

On the other hand, if the eICIC is applied, the macro cell, i.e., the eNodeB 200 does not transmit any data in the data region of the corresponding subframe, and it prevents interference. However, the macro cell, i.e., the eNodeB 200 transmits only the corresponding subframe CRS.

By using the CRS received from the macro cell, i.e., the eNodeB 200 and the small-scale cell 300 that corresponds to the pico cell respectively, the UE measures the reference signal received power (RSRP) and the reference signal received quality (RSRQ). For detailed example, if the serving cell of the UE 100 corresponds to the macro cell and the small-scale cell 300 that corresponds to the pico cell corresponds to a neighbor cell, the UE measures the RSRP and the RSRQ of the serving cell through the CRS of the macro cell 200, and measures the RSRP and the RSRQ of the neighbor cell through the CRS of the small-scale cell 300.

In the current 3GPP LTE/LTE-A standard, the cell-specific reference signal (CRS) is existed in the $0^{th}$, $4^{th}$, $7^{th}$, and $11^{th}$ OFDM symbols in each subframe on time axis. In the eICIC of LTE-A, for the compatibility with the LTE UE, separate subframe is not used, but the almost blank subframe (ABS) that does not allocate the data of the remaining part except the minimum signal required for the operation of UE including the CRS is used. Also, in case of the MBSFN ABS subframe, by additionally eliminating the remaining CRS except the first CRS, the interference among the CRSs is removed in the $4^{th}$, $7^{th}$, and $11^{th}$ OFDM symbols that includes the remaining CRS except the first CRS.

Figure 17:
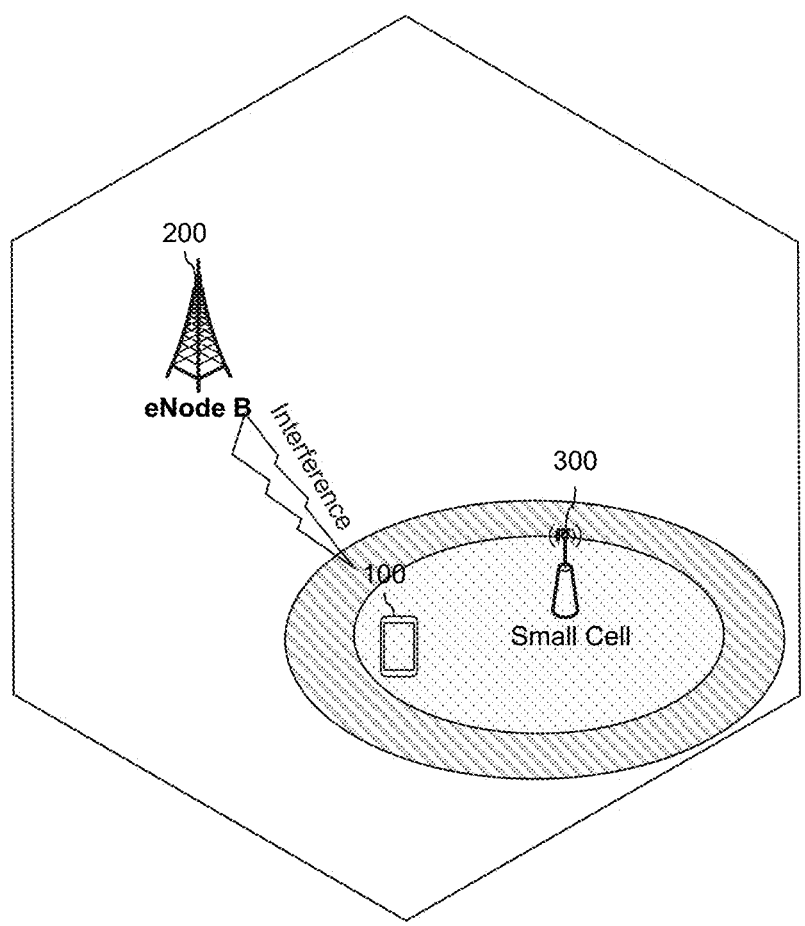
FIG. 17 illustrates a concept of expanding coverage of a small-scale cell.

FIG. 17 illustrates a concept of expanding coverage of a small-scale cell.

As depicted in FIG. 17, within the coverage of a BS (i.e., an eNodeB) 200 of a macro cell, a BS (i.e., a pico eNodeB) 300 of several small-scale cells may be installed. And if a UE that has been received service from the eNodeB 200 of the macro cell is existed in the coverage of the eNodeB 300 of the small-scale cell, the UE may handover to the eNodeB 300 of the small-scale cell, thereby obtaining the effect of offloading traffic of the eNodeB 200 of the macro cell.

Herein, the handover from the eNodeB 200 of the macro cell that corresponds to a serving BS to the eNodeB 300 of the small-scale cell that corresponds to a target BS is performed when the strength of reference signal of the target BS exceeds a specific threshold value based on the strength (RSRP, RSRQ) of the reference signal that the UE 100 received from the serving BS.

However, by putting into a certain means additionally or by improving capability of the UE 100, it can be implemented that the handover into the target BS may be performed even in case that the received reference signal strength of the target BS does not exceed the threshold value of the received reference signal strength of the serving BS, and consequently, such an operation gives birth to an effect of expanding the cell boundary or the cell radius of the BS (i.e., the pico eNodeB) 300 of the small-scale cell that corresponds to the target BS. In the drawing, the expanded coverage area which is wider than the basic coverage of the small-scale cell 300 is represented by deviant crease lines. Such an expanded coverage area may be referred to a cell range expansion (CRE).

Herein, when representing the threshold value used for normal handover as $S_{th\_conv}$, the area in which the CRE is available may be represented as an area satisfying the condition, $S_{th\_conv} <= S_{received} <= S_{th\_CRE}$.

Meanwhile, the reception strength for the reference signal from the BS of the small-scale cell 300 may be represented as the RSRP/RSRQ measured in the UE 100. However, the RSRP/RSRQ may be measured only after the UE 100 detecting, i.e., distinguishing the small-scale cell 300.

It will be described with reference to FIG. 18 in detail.

Figure 18A:
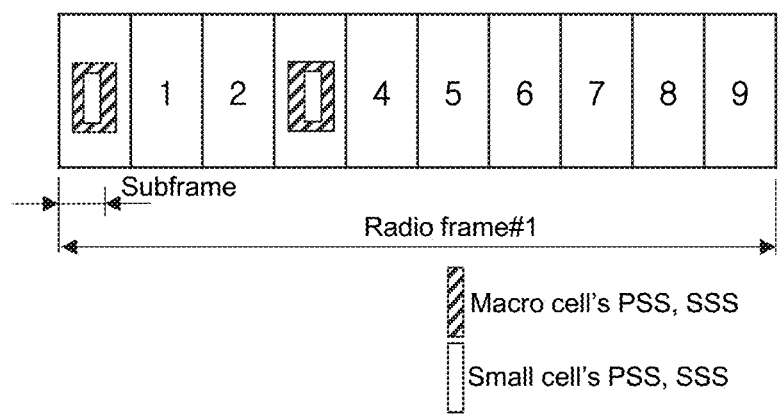
FIG. 18 illustrates the interference between signals of a macro cell and synchronization signals of a small-scale cell and the interference between reference signals.
Figure 18B:
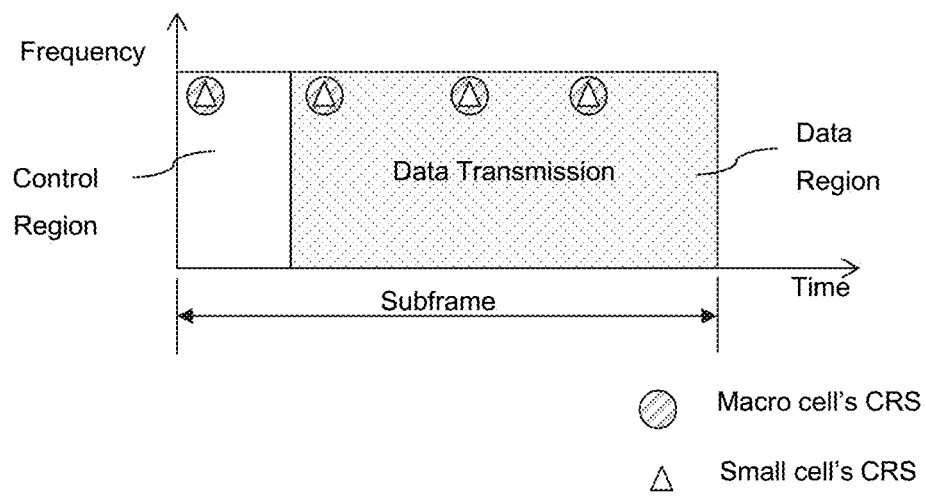

FIG. 18 illustrates the interference between signals of a macro cell and synchronization signals of a small-scale cell and the interference between reference signals.

As known from referring to FIG. 18(*a*), synchronization signals (i.e., PSS and SSS) of a macro cell and synchronization signals (i.e., PSS and SSS) of a small-scale cell act as interference mutually. Accordingly, in order for a UE 100 to properly receive the synchronization signal (i.e., PSS and SSS) of the small-scale cell, the strength of noise-interference signal in comparison with received signal should be at least lower than 6 dB.

However, in order to more increase the effect of offloading traffic into the small-scale cell 300, if trying to forcibly handover the UE 100 in the CRE area to the small-scale cell 300, firstly, the UE 100 in the expanded coverage area, that is, the CRE area should be able to detect the synchronization signal (PSS and SSS) of the small-scale cell.

In order to do that, the UE 100 should persistently use an interference removing unit 119 for the synchronization signal (PSS and SSS) as shown in FIG. 10. Similarly, the UE 100 should persistently use the interference removing unit shown in FIG. 10 also for the PBCH. Herein, the interference removing unit 119 of the UE 100 may include a PSS/SSS interference removing unit, a PBCH interference removing unit, and a CRS interference removing unit.

Particularly, since the UE 100 does not know whether the UE itself is in the expanded coverage area or the CRE area, as far as the UE is provided with the corresponding information from a serving BS, the UE should operate the interference removing unit 119 always for the PSS/SSS and the PBCH, and according to this, a power consumption is increased. This is very disadvantageous in an aspect of the battery capacity of UE.

In addition, referring to FIG. 18(*b*), the CRS of macro cell and the CRS of small-scale cell act as interference mutually. Accordingly, in order for the UE 100 in the expanded coverage area, i.e., the CRE area to properly receive the CRS of small-scale cell, the interference removing unit should be always operated, and according to this, the power consumption becomes increased. This is very disadvantageous in an aspect of the battery capacity of UE.

However, if the UE 100 detects that it is located in the expanded coverage area or the CRE area, and operate the PSS/SSS interference removing unit, the PBCH interference removing unit, and the CRS interference removing unit in the interference removing unit 119 only in case that the UE is located in the area (that is, the UE is located in an area in which an operation of the interference removing unit is required), the power consumption may be significantly decreased.

Accordingly, hereinafter, a method of determining when the interference removing unit is operated in order for the UE 100 to perform a cell detection and measurement for the small-scale cell 300 will be described. The method may be divided into a method by a UE and a method by a BS. First, the method by a UE will be described with reference to FIG. 19 below.

Figure 19A:
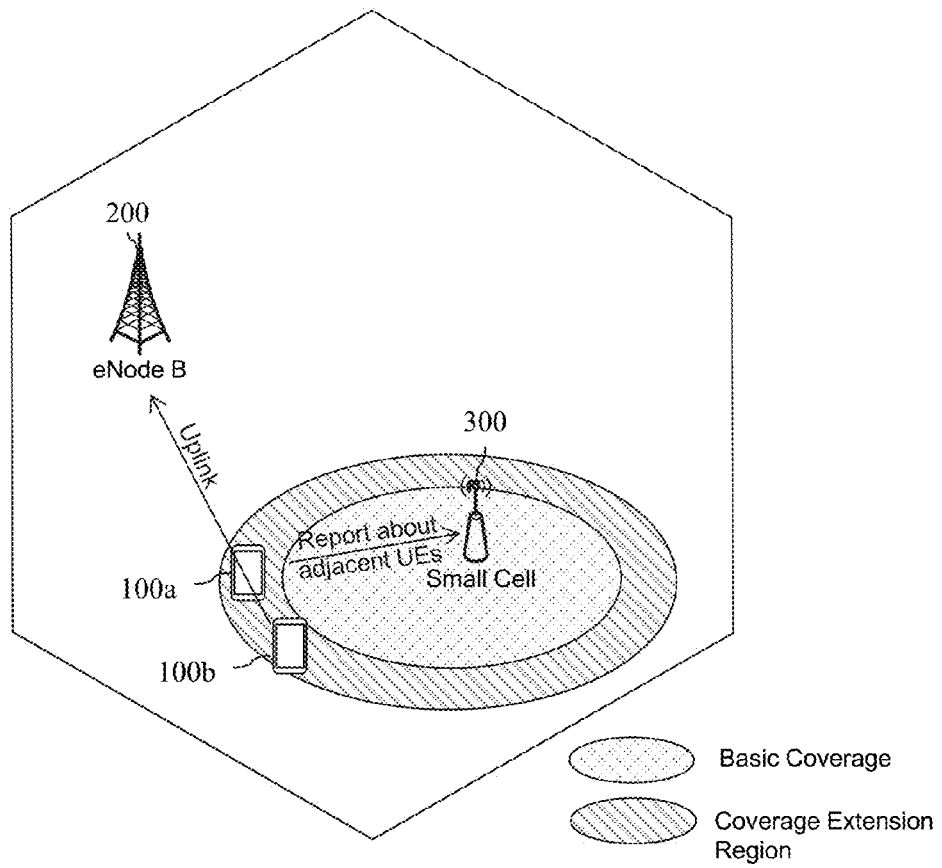
FIG. 19 is a flowchart illustrating an operation of a UE according to an embodiment of the present invention.
Figure 19B:
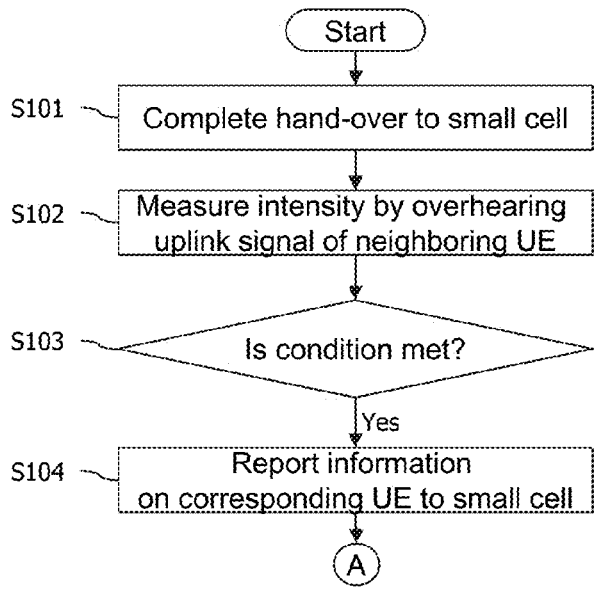

FIG. 19 is a flowchart illustrating an operation of a UE according to an embodiment of the present invention.

As known with reference to FIG. 19(a), a first UE 100a and a second UE 100b are positioned at a basic coverage outside region of a small-scale cell, that is, a coverage extension region, that, a CRE region.

In this case, the first UE 100a has been handed over to the small-scale cell 300 (S101).

The first UE 100a overhears an uplink signal of a neighboring UE to measure a signal intensity (S102).

For example, the first UE 100a overhears an uplink signal which the second UE 100b transmits to the macro cell 200 to measure the signal intensity. As described above, the first UE 100a's overhearing the uplink signal of the second UE 100b may be called overhearing by a device to device (D2D). The uplink signal may be at least one of a PUCCH, a PUSCH, a PRACH, and the like.

Alternatively, when the first UE 100a and the second UE 100b support a D2D function, the second UE 100b may transmit a discovery signal for the D2D and the first UE 100a may receive the D2D discovery signal. Here, the discovery signal for the D2D is a basic signal in which any one UE transmits a specific signal to another UE and detects the transmitted signal in order for the first UE 100a and the second UE 100b to perform D2D communication. The discovery signal may be signals such as a UE-specific reference signal (URS), a demodulation reference signal (DM-RS), a sounding reference signal (SRS), and the like which are reused or a new dedicated discovery signal. According to a discussion in the 3GPP standard at present, a non UE specific method and a UE specific method are provided. First, the non UE specific method is a scheme that defines a resource for the discovery signal and an allocation cycle of the resource in a network and notifies the defined resource and allocation cycle to UEs. In addition, the UE specific method is a method that designates the network to use different resources for each UE.

Meanwhile, when the measurement is completed as described above, the first UE 100a determines whether signal intensities of the neighboring UEs meet a predetermined condition (S103). For example, the first UE 100a may determine whether the signal intensity Y is equal to or less than a predetermined value X.

When the condition is met (for example, when the signal intensity Y is equal to or less than the predetermined value X), the first UE 100a may report information on the corresponding UE, which meets the condition to the small-scale cell (S104). Then, the small-scale cell performs A as illustrated in FIG. 20.

Figure 20A:
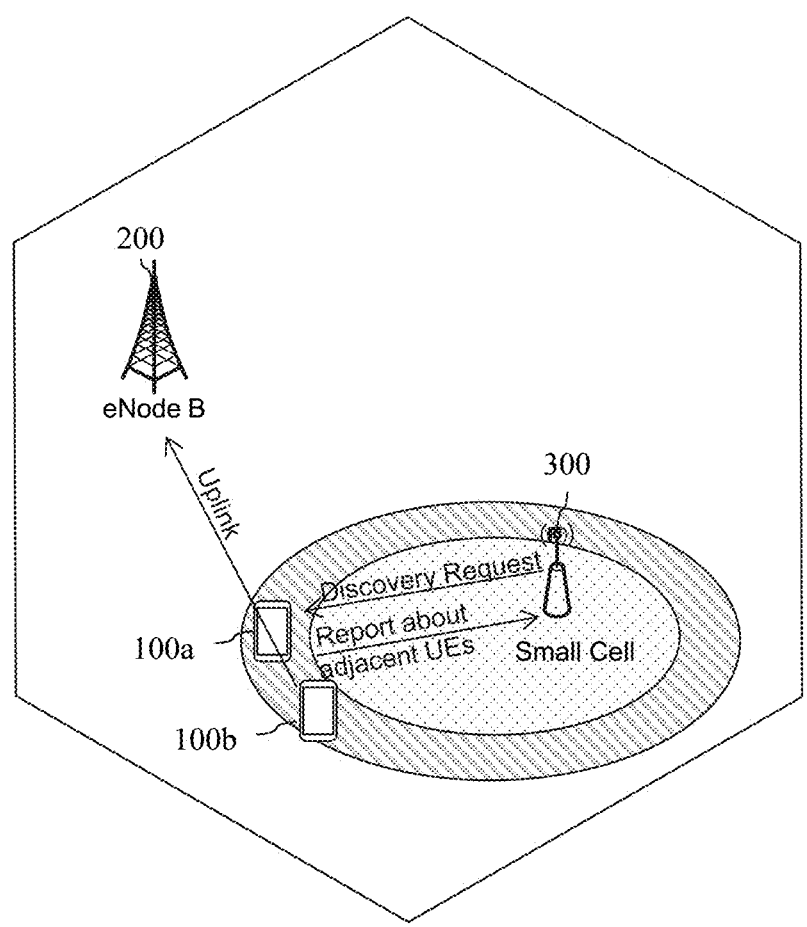
FIG. 20 is a flowchart illustrating an operation of a base station of a small-scale cell according to an embodiment of the present invention.
Figure 20B:
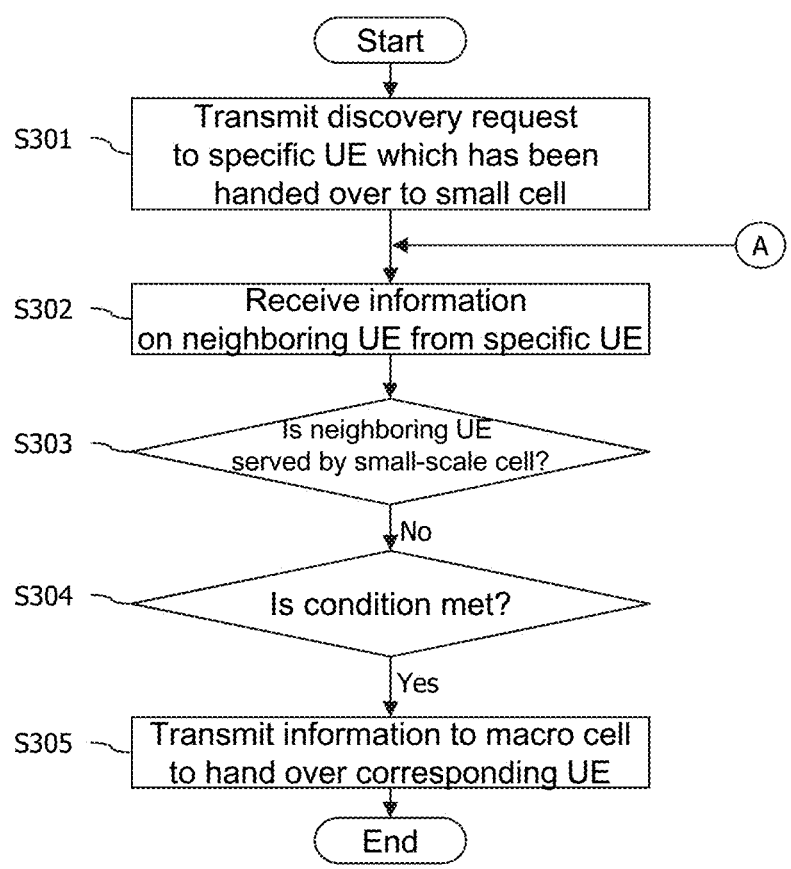

FIG. 20 is a flowchart illustrating an operation of the small-scale cell according to an embodiment of the present invention.

As known with reference to FIG. 20, the first UE 100a and the second UE 100b are positioned at the basic coverage outside region of the small-scale cell, that is, the coverage extension region, that, the CRE region and in this case, the first UE 100a has been handed over to the small-scale cell 300.

Then, the small-scale cell 300 requests discoverying the neighboring UEs to the first UE 100a (S301).

The first UE 100a overhears the uplink signal of the neighboring UE to measure the signal intensity (S102).

The first UE 100a determines whether the signal intensities of the neighboring UEs meet a predetermined condition. For example, the first UE 100a may determine whether the signal intensity Y is equal to or less than the predetermined value X.

When the condition is met (for example, when the signal intensity Y is equal to or less than the predetermined value X), the small-scale cell 300 receives information on the UE, for example, information on the second UE 100b from the first UE 100a (S302). The small-scale cell 300 determines whether information on the neighboring UE of the first UE 100a, for example, the second UE 100b is served thereby.

When the neighboring UE, for example, the second UE 100b is served by not the small-scale cell 300 but the macro cell, the small-scale cell 300 determines whether the neighboring UE, for example, the second UE 100b meets a predetermined condition (S304).

When the neighboring UE, for example, the second UE 100b meets the predetermined condition, the small-scale cell transfers the information to the macro cell in order to hand over the neighboring UE, for example, the second UE 100b form the macro cell (S305). Then, the macro cell may start a procedure for handing over the neighboring UE, for example, the second UE 100b to the small-scale cell.

Figure 21:
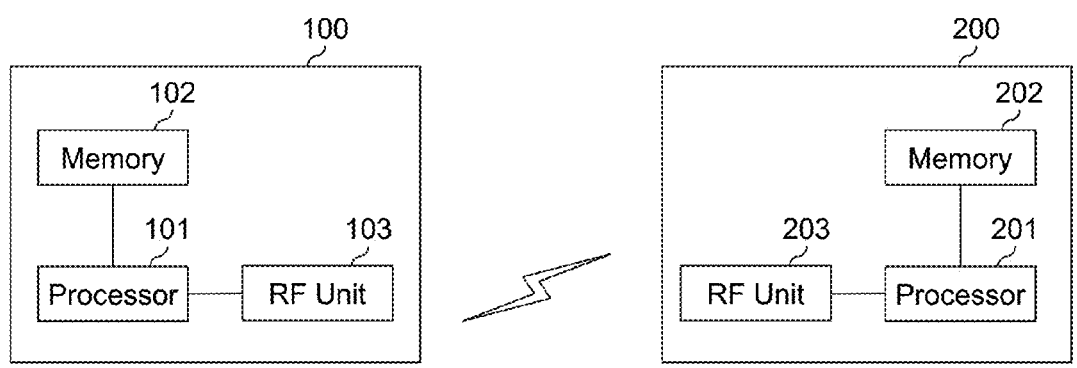
FIG. 21 is a block diagram illustrating a wireless communication system in which the embodiment of the present invention is implemented.

FIG. 21 is a block diagram illustrating a wireless communication system where an embodiment of the present invention is implemented.

The base station for macro cell or small cell 200 includes a processor 201, a memory 202, and an RF (radio frequency) unit 203. The memory 202 is connected with the processor 201 and stores various pieces of information for driving the processor 201. The RF unit 203 is connected with the processor 201 and transmits and/or receives radio signals. The processor 201 implements functions, processes, and/or methods as suggested herein. In the above-described embodiments, the operation of the base station may be implemented by the processor 201.

The wireless device 100 such as UE includes a processor 101, a memory 102, and an RF unit 103. The memory 102 is connected with the processor 101 and stores various pieces of information for driving the processor 101. The RF unit 103 is connected with the processor 101 and transmits and/or receives radio signals. The processor 101 implements functions, processes, and/or methods as suggested herein. In the above-described embodiments, the operation of the wireless device may be implemented by the processor 101.

The processor may include an ASIC (application-specific integrated circuit), other chipsets, a logic circuit, and/or a data processing device. The memory may include an ROM (read-only memory), an RAM (random access memory), a flash memory, a memory card, a storage medium, and/or other storage devices. The RF unit may include a baseband circuit for processing radio signals. When an embodiment is implemented in software, the above-described schemes may be realized in modules (processes, or functions) for performing the above-described functions. The modules may be stored in the memory and executed by the processor. The memory may be positioned in or outside the processor and may be connected with the processor via various well-known means.

In the above-described systems, the methods are described with the flowcharts having a series of steps or blocks, but the present invention is not limited to the steps or order. Some steps may be performed simultaneously or in a different order from other steps. It will be understood by one of ordinary skill that the steps in the flowcharts do not exclude each other, and other steps may be included in the flowcharts or some of the steps in the flowcharts may be deleted without affecting the scope of the invention. The present invention may be used in a user equipment, a base station, or other equipment of a wireless mobile communication system.

INDUSTRIAL APPLICABILITY

The present invention may be used for a terminal, a base station or other equipment of wireless mobile communication systems.

What is claimed is:

1. A method for providing information on a neighboring user equipment (UE) in a wireless communication system in which a macro cell and a small cell coexist, the method performed by a UE served by a small cell and comprising:
   performing, by the UE, a handed over from the macro cell to the small cell;
   overhearing a signal transmitted by the neighboring UE after the hand-over is completed;
   measuring a signal intensity of the neighboring UE; and
   transferring information on the neighboring UE to the small cell when the signal intensity meets a predetermined condition.

2. The method of claim 1, wherein the hand-over is performed when the UE is positioned at a coverage extension region of the small cell or a cell range expansion (CRE) region.

3. The method of claim 1, wherein the overheard signal is a device to device (D2D) discovery signal transmitted by the neighboring UE.

4. The method of claim 3, wherein the discovery signal is a UE-specific reference signal (URS), a demodulation reference signal (DM-RS), or a sounding reference signal (SRS), or a discovery dedicated signal.

5. The method of claim 1, wherein the overheard signal is an uplink signal which the neighboring UE transmits to the macro cell.

6. The method of claim 5, wherein the uplink signal is a PUCCH or a PUSCH.

7. The method of claim 1, wherein when the neighboring UE is not served by the small cell, the information on the neighboring UE is used by the small cell in order to request the hand-over to the macro cell.

8. A method for acquiring information on a user equipment (UE) from a UE served by a small cell in a wireless communication system in which a macro cell and the small cell coexist, the method comprising:
   transferring, the small cell, a request for discovering one or more neighboring UEs to a UE handed over from the macro cell;
   receiving, by the small cell, information on one or more neighboring UEs from the UE;
   verifying whether one or more neighboring UEs are served by the small cell itself; and
   transferring the information on one or more neighboring UEs in order to hand over one or more neighboring UEs not served by the small cell itself from the macro cell.

9. The method of claim 8, wherein the UE is a UE which has been handed over from the macro cell at the position of a coverage extension region of the small cell or a cell range expansion (CRE) region.

10. The method of claim 8, wherein the transferring of the information on one or more neighboring UEs is performed when the neighboring UE meets a predetermined condition.

11. The method of claim 10, wherein the predetermined condition is met when the signal intensity of the neighboring UE measured by the UE is equal to or less than a predetermined value.

* * * * *